US012619247B2

(12) United States Patent
Katsumata et al.

(10) Patent No.: US 12,619,247 B2
(45) Date of Patent: May 5, 2026

(54) MOBILE OBJECT, INFORMATION PROCESSING METHOD, INFORMATION PROCESSING SYSTEM, AND COMPUTER PROGRAM

(71) Applicant: Sony Group Corporation, Tokyo (JP)

(72) Inventors: Yuki Katsumata, Tokyo (JP); Akira Fukui, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 103 days.

(21) Appl. No.: 18/686,887

(22) PCT Filed: Jul. 6, 2022

(86) PCT No.: PCT/JP2022/026779
§ 371 (c)(1),
(2) Date: Feb. 27, 2024

(87) PCT Pub. No.: WO2023/037741
PCT Pub. Date: Mar. 16, 2023

(65) Prior Publication Data
US 2024/0370026 A1      Nov. 7, 2024

(30) Foreign Application Priority Data

Sep. 9, 2021      (JP) ................................. 2021-147143

(51) Int. Cl.
*G05D 1/224*          (2024.01)
*G05D 1/227*          (2024.01)
(Continued)

(52) U.S. Cl.
CPC ......... *G05D 1/2247* (2024.01); *G05D 1/2278* (2024.01); *G05D 1/82* (2024.01);
(Continued)

(58) Field of Classification Search
CPC ........ G05D 1/2247; G05D 1/82; G05D 1/852; G05D 1/2246; G05D 1/243; G05D 1/2278;
(Continued)

(56) References Cited

U.S. PATENT DOCUMENTS

2020/0066031 A1* 2/2020 Neubauer .............. G01C 23/00
2021/0181766 A1* 6/2021 Geng ....................... G08G 5/57
(Continued)

FOREIGN PATENT DOCUMENTS

JP      2017-041262 A      2/2017
JP      2017-078704 A      4/2017
(Continued)

OTHER PUBLICATIONS

International Search Report and Written Opinion mailed on Aug. 30, 2022, received for PCT Application PCT/JP2022/026779, filed on Jul. 6, 2022, 13 pages including English Translation.

*Primary Examiner* — Michael J Zanelli
(74) *Attorney, Agent, or Firm* — XSENSUS LLP

(57)      ABSTRACT

A mobile object includes: a remaining energy amount acquisition unit that acquires the amount of energy remaining in the mobile object; and a range specifying unit that specifics, on the basis of the amount of energy remaining in the mobile object, a movement range in which the mobile object can return from the current position to the return position.

17 Claims, 16 Drawing Sheets

(51) Int. Cl.

| | |
|---|---|
| *G05D 1/82* | (2024.01) |
| *G05D 1/85* | (2024.01) |
| *G06V 10/764* | (2022.01) |
| *G06V 20/17* | (2022.01) |

(52) U.S. Cl.
CPC ......... *G05D 1/852* (2024.01); *B64U 2201/20* (2023.01); *G06V 10/764* (2022.01); *G06V 20/17* (2022.01)

(58) Field of Classification Search
CPC ......... G05D 2109/254; G05D 2111/10; G06V 10/764; G06V 20/17; G01C 21/20; B64U 50/19; B64U 50/30; B64U 2201/10; B64U 2201/20; Y02T 90/16
See application file for complete search history.

(56) References Cited

U.S. PATENT DOCUMENTS

| | | | | |
|---|---|---|---|---|
| 2021/0309364 A1* | 10/2021 | Lei | ............................ | G08G 5/22 |
| 2022/0185317 A1* | 6/2022 | Kraft | .................... | A01D 34/008 |
| 2023/0067113 A1* | 3/2023 | Tanaka | ..................... | G08G 5/55 |
| 2024/0302841 A1* | 9/2024 | Lu | ......................... | G05D 1/2464 |

FOREIGN PATENT DOCUMENTS

| | | | | |
|---|---|---|---|---|
| JP | 2018-055463 A | 4/2018 | | |
| JP | 2018-165872 A | 10/2018 | | |
| JP | 2019-073056 A | 5/2019 | | |
| JP | 2020-057225 A | 4/2020 | | |
| JP | 2021-197857 A | 12/2021 | | |
| WO | WO-2020006658 A1 * | 1/2020 | ............... | G08G 5/74 |

* cited by examiner

FIG. 1
S1
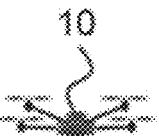
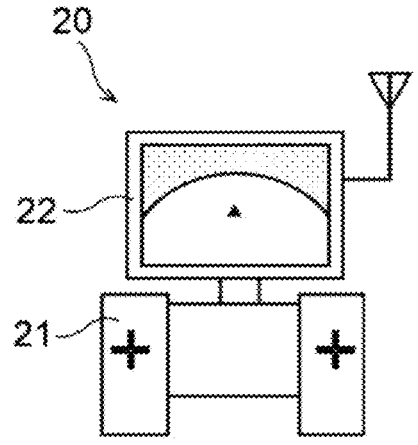
FIG. 2
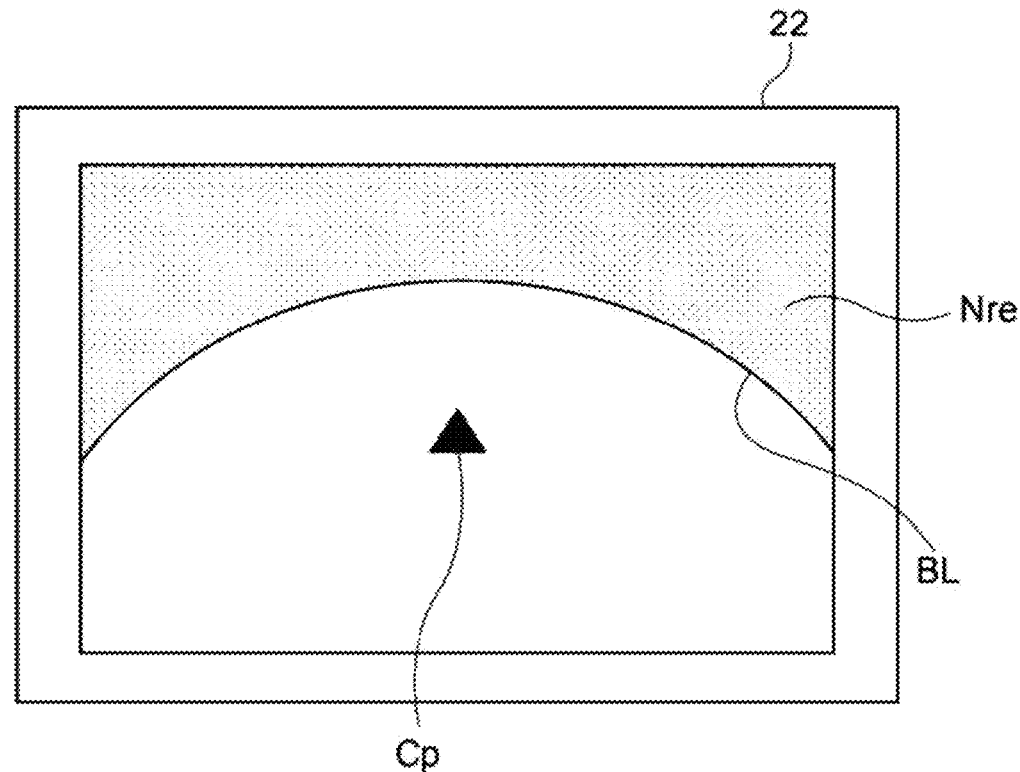

FIG. 3
S1
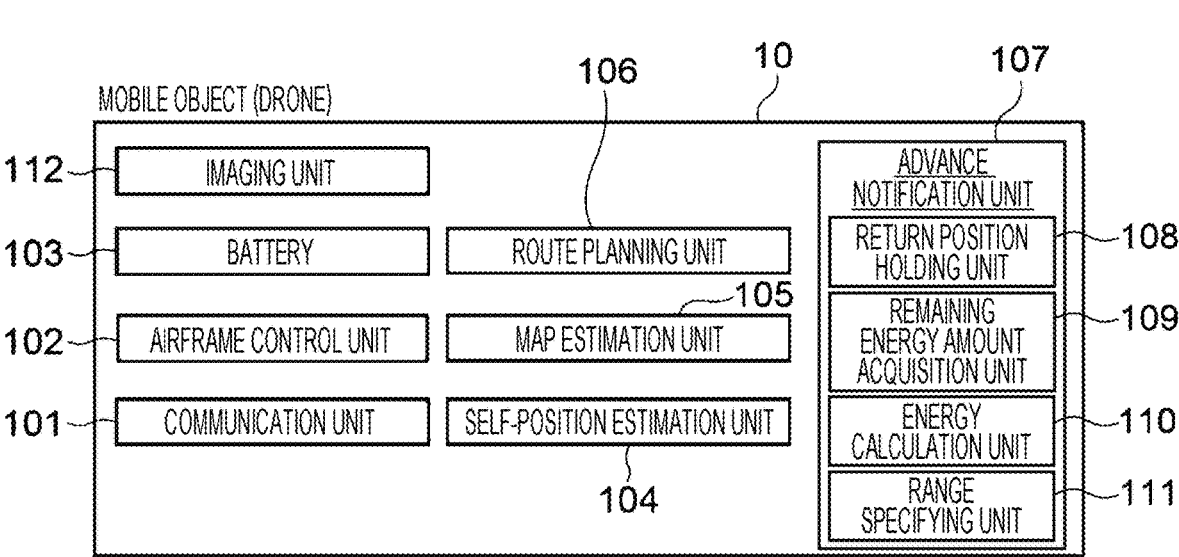
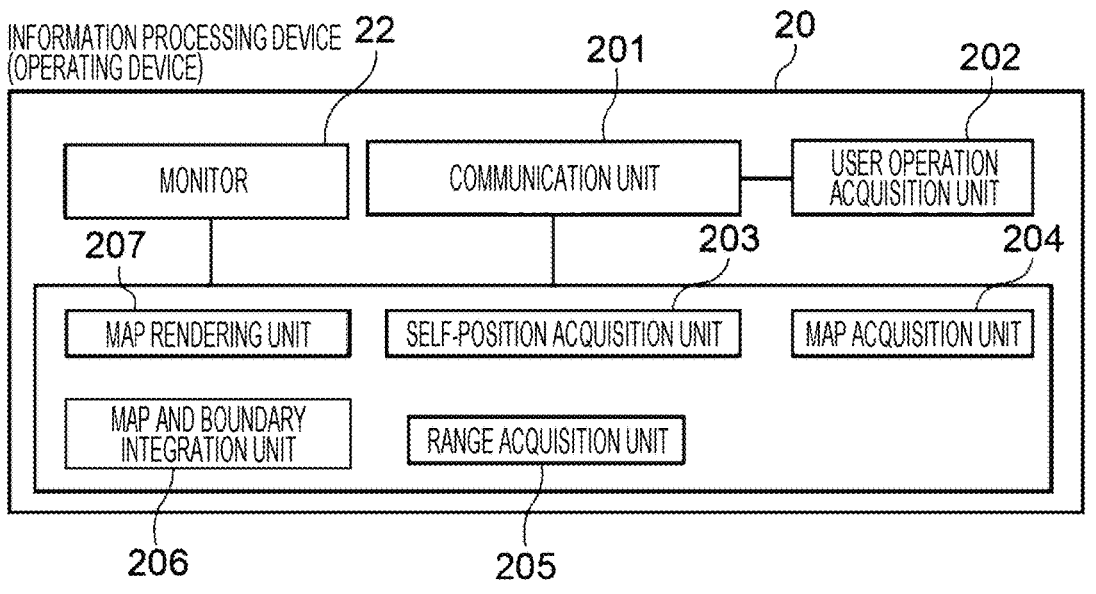

*FIG. 5*

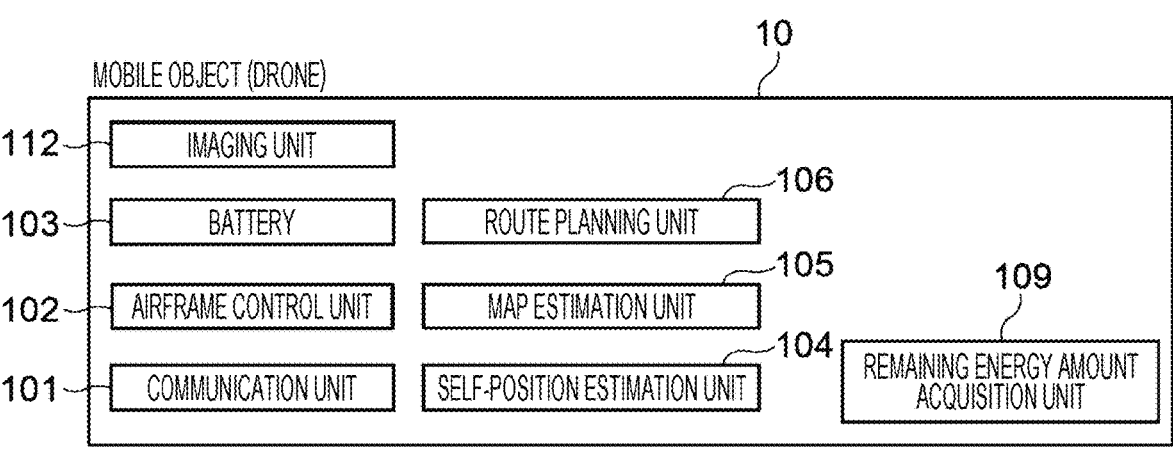

MOBILE OBJECT (DRONE) 10

112 — IMAGING UNIT

103 — BATTERY

106 — ROUTE PLANNING UNIT

102 — AIRFRAME CONTROL UNIT

105 — MAP ESTIMATION UNIT

101 — COMMUNICATION UNIT

104 — SELF-POSITION ESTIMATION UNIT

109 — REMAINING ENERGY AMOUNT ACQUISITION UNIT

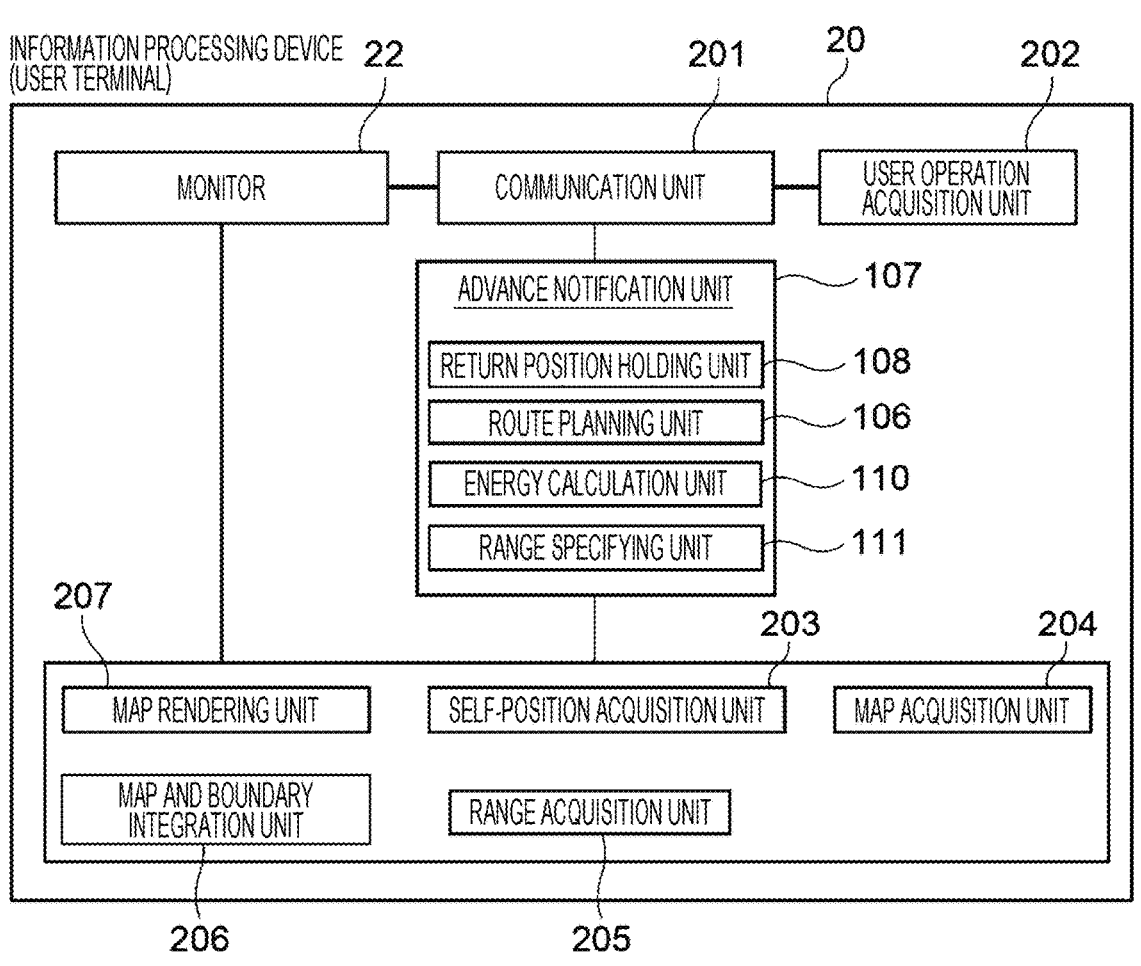

INFORMATION PROCESSING DEVICE (USER TERMINAL) 22 201 20 202

MONITOR

COMMUNICATION UNIT

USER OPERATION ACQUISITION UNIT

ADVANCE NOTIFICATION UNIT — 107

RETURN POSITION HOLDING UNIT — 108

ROUTE PLANNING UNIT — 106

ENERGY CALCULATION UNIT — 110

RANGE SPECIFYING UNIT — 111

207 203 204

MAP RENDERING UNIT

SELF-POSITION ACQUISITION UNIT

MAP ACQUISITION UNIT

MAP AND BOUNDARY INTEGRATION UNIT

RANGE ACQUISITION UNIT 206 205

*FIG. 7*
<u>S2</u>
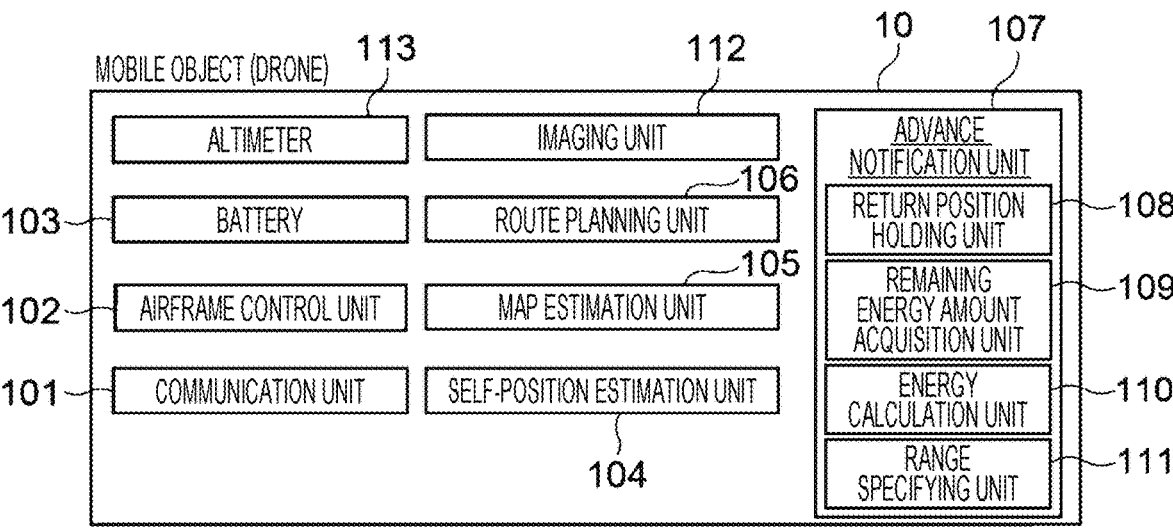
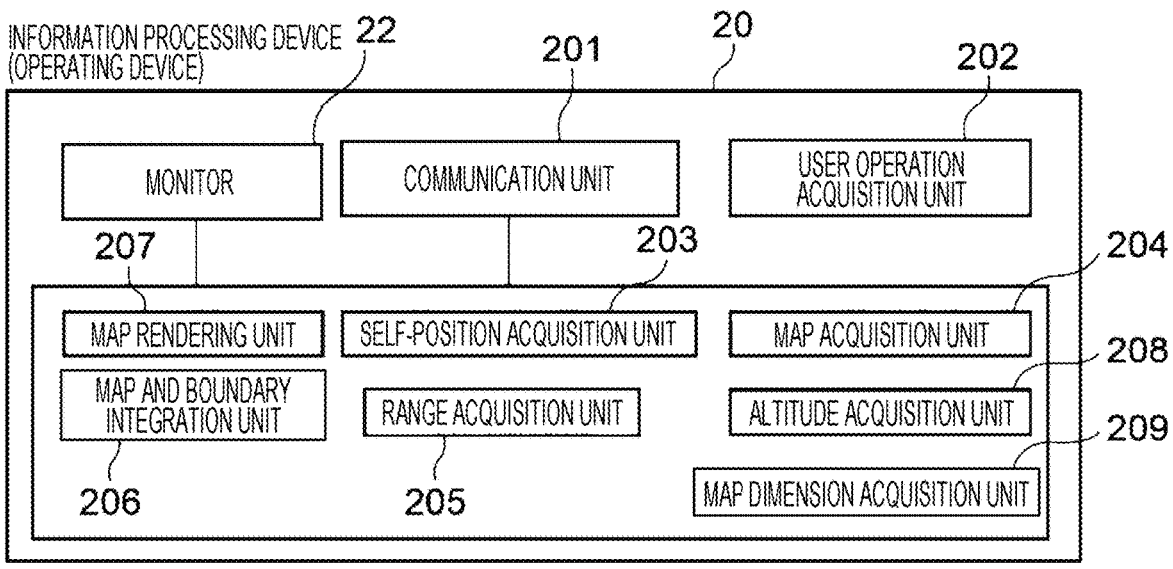

FIG. 9
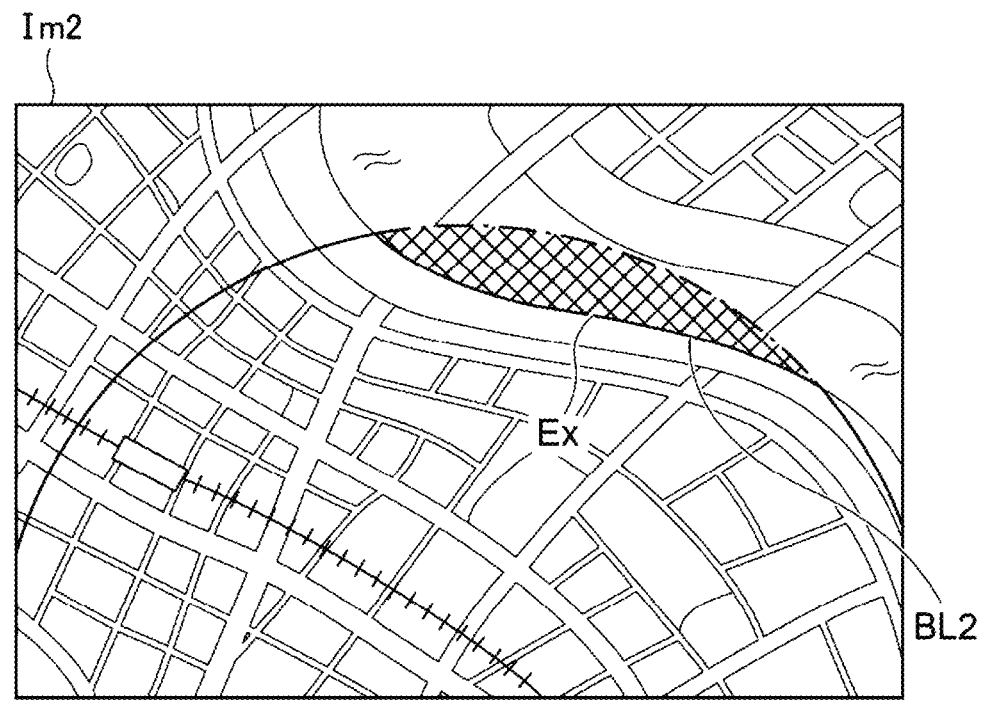
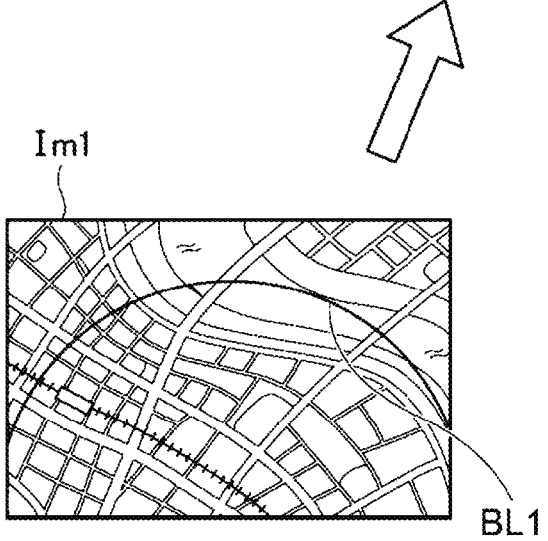

FIG. 10
S3
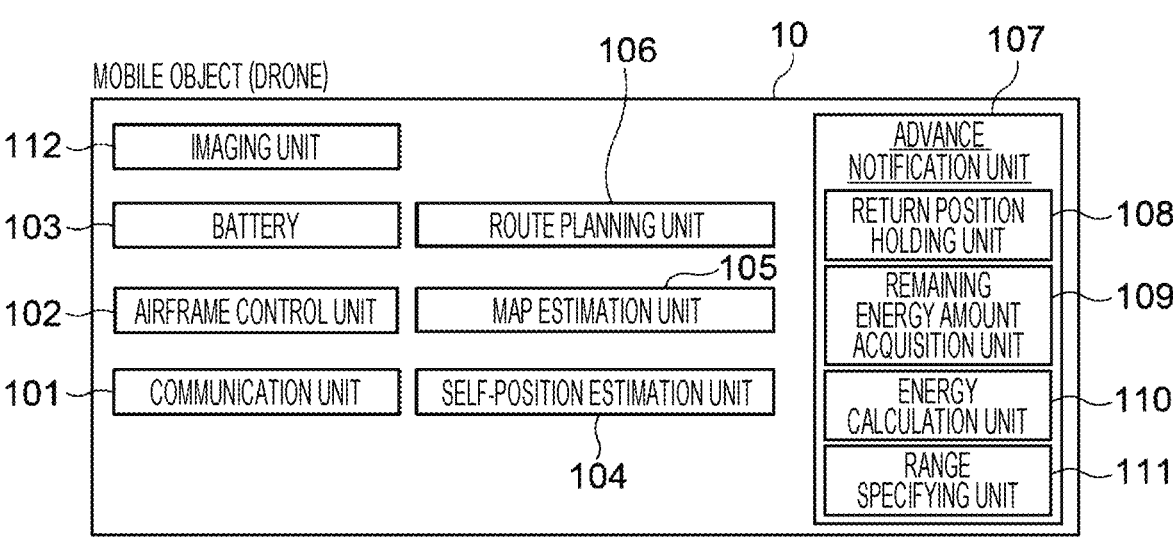
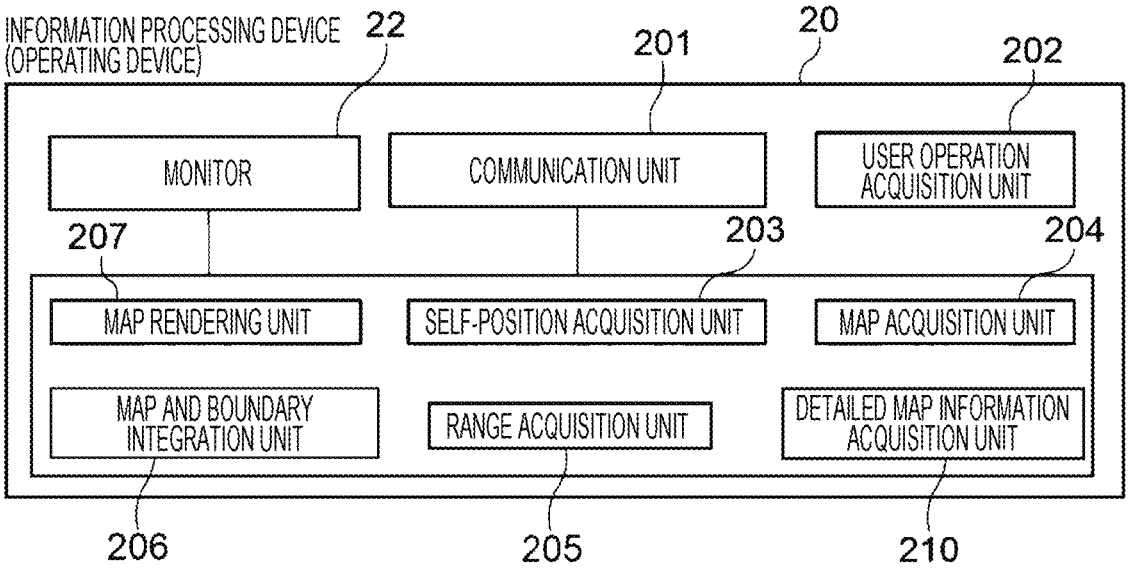

FIG. 12
S4
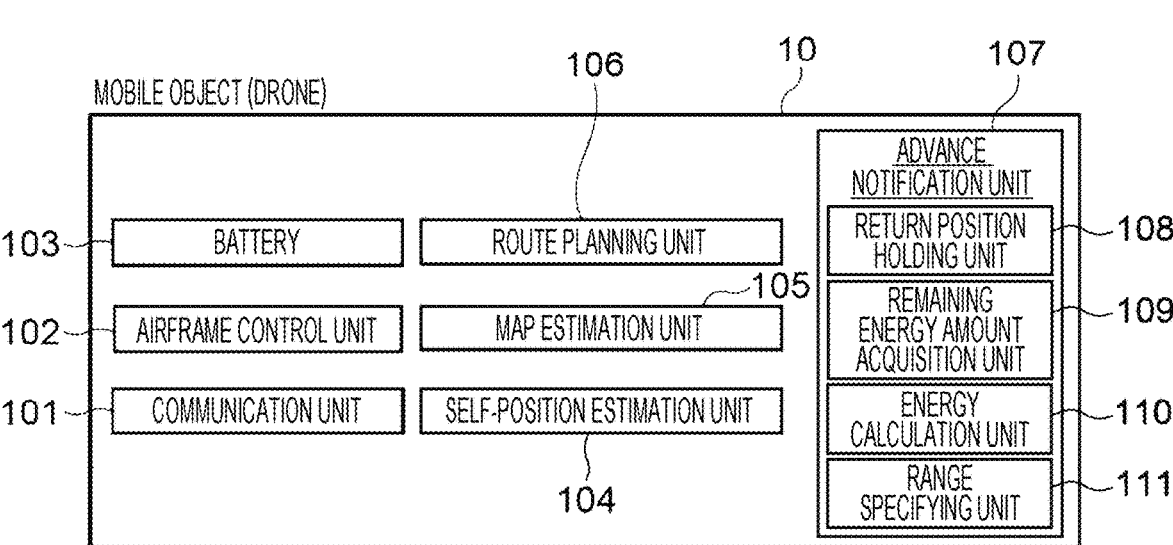
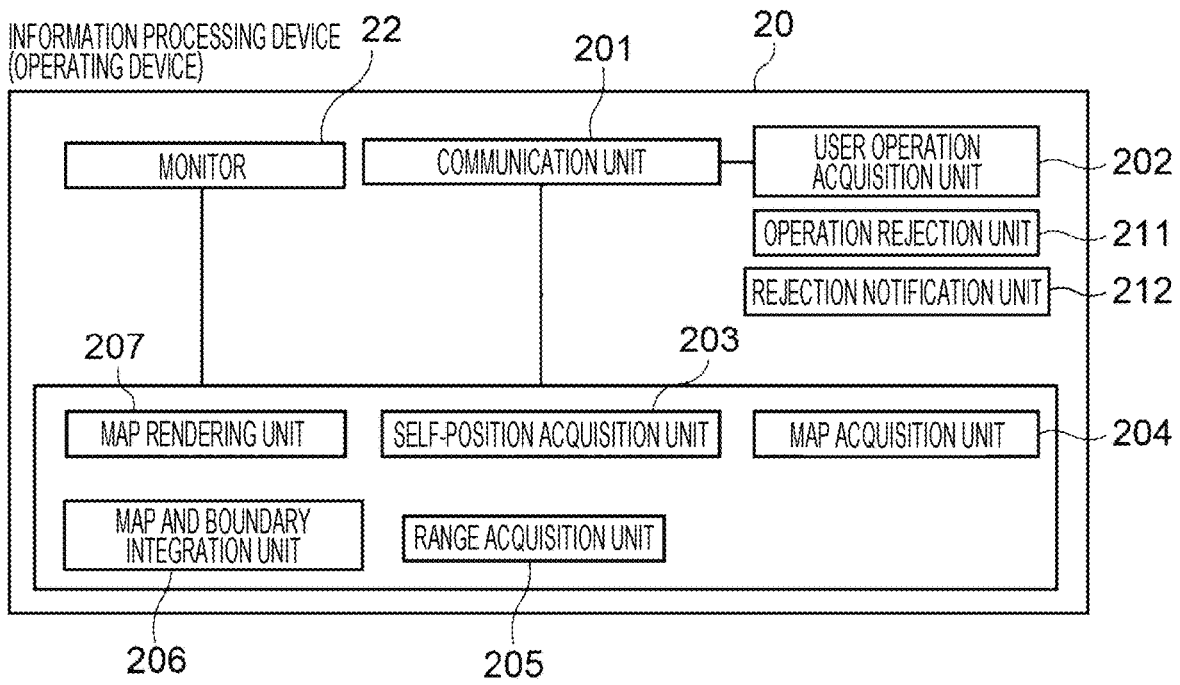

FIG. 15
S5
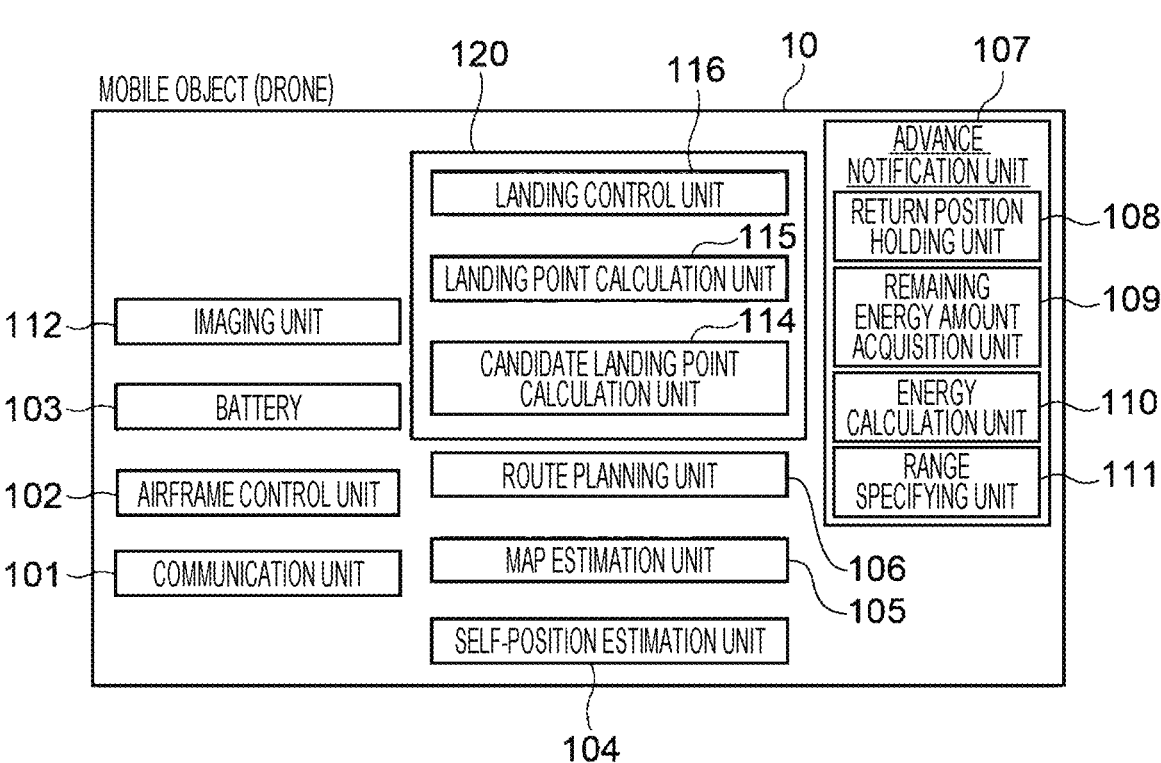
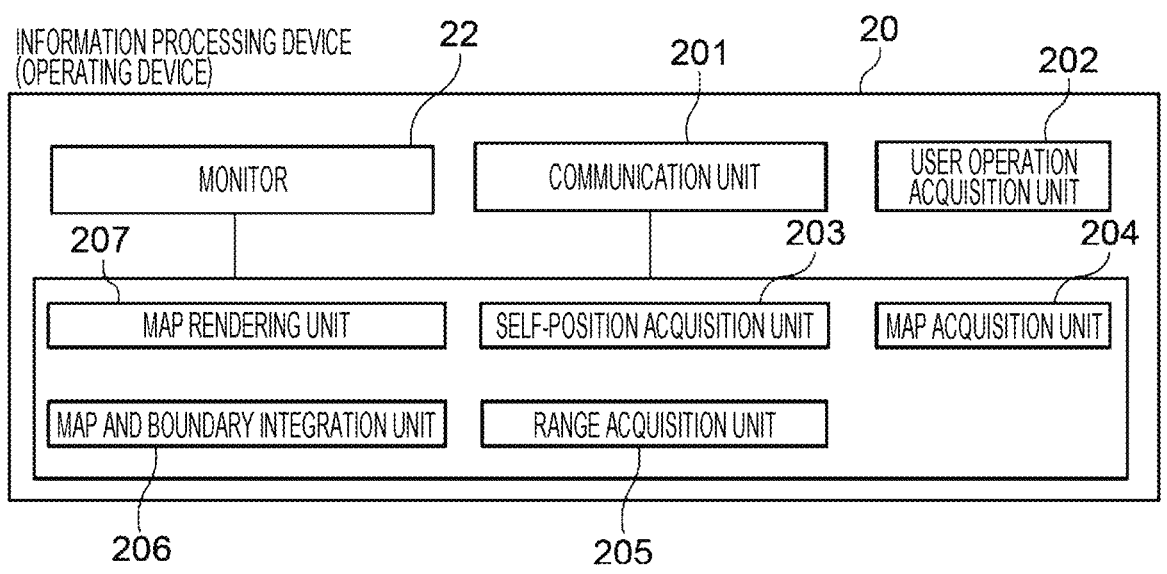

MOBILE OBJECT, INFORMATION PROCESSING METHOD, INFORMATION PROCESSING SYSTEM, AND COMPUTER PROGRAM

CROSS-REFERENCE TO RELATED APPLICATIONS

The present application is based on PCT filing PCT/JP2022/026779, filed Jul. 6, 2022, which claims priority from Japanese Patent Application No. 2021-147143, filed Sep. 9, 2021, the entire contents of each are incorporated herein by reference.

TECHNICAL FIELD

The present disclosure relates to a mobile object, an information processing method, an information processing system, and a computer program.

BACKGROUND ART

In recent years, mobile objects called autonomous mobile robots have attracted attention in various industrial fields. An example of mobile objects is drones. Drones are already being used for various purposes such as aerial photographing, measurement, disaster relief, and transportation and logistics.

A mobile object might unexpectedly stop due to energy shortage. Therefore, there is a technology for notifying the user of the remaining battery charge and the operable time, to prompt the user to avoid an unexpected stop of the mobile object. Further, there also is a technique of forcibly causing a mobile object to return when the remaining battery charge falls below a predetermined value (see Patent Document 1).

However, from a notification of the remaining battery charge and the operable time, it is difficult to see to what extent the mobile object can be actually moved. Therefore, even in a case where the mobile object is returned to a desired return point with the remaining battery charge or the operable time used as an index, a situation in which the mobile object fails to return might occur.

In particular, as to an unmanned mobile object such as a drone that is operated by the user from a remote place, it is difficult for the user to intuitively grasp the service limit of the mobile object. It is considered that, for that reason, an unexpected stop is likely to occur during returning.

CITATION LIST

Patent Document

Patent Document 1: Japanese Patent Application Laid-Open No. 2019-73056

SUMMARY OF THE INVENTION

Problems to be Solved by the Invention

The present disclosure has been made in view of the above circumstances, and provides a mobile object, an information processing method, an information processing system, and a computer program for effectively preventing a situation in which the mobile object fails to reach the return position.

Solutions to Problems

A mobile object according to the present disclosure includes: a remaining energy amount acquisition unit that acquires the amount of energy remaining in the mobile object; and a range specifying unit that specifies a movement range in which the mobile object can return from the position of the mobile object to a return position, on the basis of the amount of energy remaining in the mobile object.

An information processing method according to the present disclosure includes: a step of acquiring the amount of energy remaining in a mobile object; and a step of specifying a movement range in which the mobile object can return from the position of the mobile object to the return position, on the basis of the amount of energy remaining in the mobile object.

An information processing system according to the present disclosure includes: a mobile object: a remaining energy amount acquisition unit that acquires the amount of energy remaining in the mobile object; a range specifying unit that specifies a movement range in which the mobile object can return from the position of the mobile object to the return position, on the basis of the amount of energy remaining in the mobile object; and a map rendering unit that displays the movement range superimposed on a map image.

A computer program according to the present disclosure causes a computer to carry out: a step of acquiring the amount of energy remaining in a mobile object; and a step of specifying a movement range in which the mobile object can return from the position of the mobile object to the return position, on the basis of the amount of energy remaining in the mobile object.

BRIEF DESCRIPTION OF DRAWINGS

FIG. 1 is a diagram illustrating an information processing system according to a first embodiment.

FIG. 2 is a diagram illustrating an example of an image displayed on an information processing device in the information processing system according to the first embodiment.

FIG. 3 is block diagrams of both a mobile object and the information processing device in the information processing system according to the first embodiment.

FIG. 5 is block diagrams of both a mobile object and an information processing device in an information processing system according to a modification of the first embodiment.

FIG. 7 is block diagrams of both a mobile object and an information processing device in the information processing system according to the second embodiment.

FIG. 9 is a conceptual diagram of a boundary defining an entry unrecommended region, the boundary being specified by an information processing system according to a third embodiment.

FIG. 10 is block diagrams of both a mobile object and an information processing device in the information processing system according to the third embodiment.

FIG. 12 is block diagrams of both a mobile object and an information processing device in an information processing system according to a fourth embodiment.

FIG. 15 is block diagrams of both a mobile object and an information processing device in the information processing system according to the fifth embodiment.

MODE FOR CARRYING OUT THE INVENTION

Figure 4:
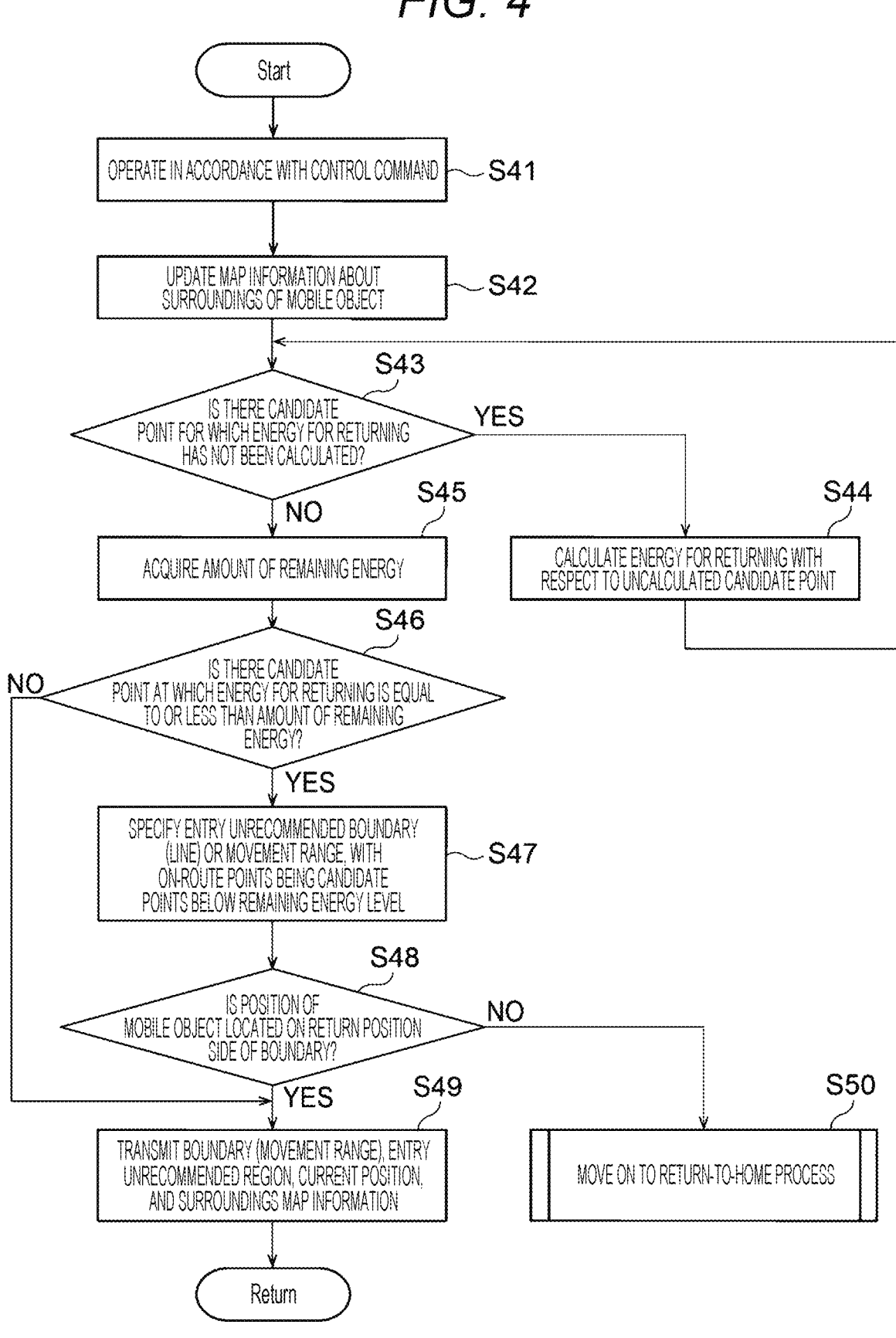
FIG. 4 is a flowchart illustrating an example of a process to be performed by the mobile object in the information processing system according to the first embodiment.

The following is a description of embodiments of the present disclosure, with reference to the drawings. In one or more embodiments described in the present disclosure, components included in each of the embodiments can be combined with each other, and the combined resultant also forms part of the embodiments described in the present disclosure.

First Embodiment

FIG. 1 illustrates an information processing system S1 according to a first embodiment. First, a schematic configuration of the information processing system S1 is described. (Information Processing System)

The information processing system S1 illustrated in FIG. 1 includes a mobile object 10 and an information processing device 20. The mobile object 10 is a drone (an unmanned aerial vehicle), for example. However, the mobile object 10 is not limited to any particular device, as long as the mobile object 10 is a device that can move by an autonomous and/or manual operation, such as a robot automated guided vehicle or an automated driving vehicle.

The mobile object 10 and the information processing device 20 can perform bidirectional wireless communication. The mobile object 10 basically flies (moves) under the control of the information processing device 20. In this case, the mobile object 10 receives, from the information processing device 20, for example, a control command based on the user's intention such as forward movement, backward movement, left turning, right turning, upward movement, or downward movement, and is operated in accordance with the control command (a manual operation).

In addition to the above example, the control command includes a command related to movement to a target position relatively or absolutely determined with respect to the mobile object 10. The control command also includes a command or the like related to a state change to a target velocity, a target angular velocity during turning, a target posture, or the like.

The control on the mobile object 10 by a manual operation as described above may be performed within the field of view of the user, or may be performed outside the field of view. However, in a case where the manual operation is performed outside the field of view, a means capable of recognizing the current position of the mobile object 10 is necessary. Such a means may be display of the current position of the mobile object 10 on a monitor 22 described later included in the information processing device 20, display of the image being captured by the mobile object 10, or the like, for example.

Meanwhile, the mobile object 10 is also capable of autonomous flying (autonomous moving). Specifically, after a route is designated from the information processing device 20, the mobile object 10 can autonomously move along the designated route. The mobile object 10 can also generate a route to a predetermined return position, and autonomously return along the generated route. Such an autonomous return process is referred to as return to home (hereinafter, "RTH") in some cases. Note that autonomous movement may be performed within the field of view of the user, or may be performed outside the field of view.

The RTH mentioned above may be started in response to a control command from the user, or may be forcibly started when the remaining battery level falls below a predetermined value.

Further, the mobile object 10 can also perform semi-autonomous flight. The semi-autonomous flight mentioned herein means an operation state in which autonomous flight is temporarily performed during manually controlled flight. For example, the mobile object 10 during manually controlled flight may become unable to communicate with the information processing device 20, or may go into the back of a structure or the like and move out of the user's field of view. In such a case, the mobile object 10 may temporarily shift to the RTH and perform semi-autonomous flight, for example.

The information processing device 20 is an operating device that is operated by the user, and is a so-called remote controller in the present embodiment. The information processing device 20 includes an operating unit 21 that is operated by the user, and a monitor 22. The user operates the operating unit 21 in a case where a control command for the mobile object 10 is to be generated. The monitor 22 can display a map image on which an indicator of the current position of the mobile object 10 is superimposed, for example. Also, the monitor 22 can display an image captured by the mobile object 10, for example. The monitor 22 may be integrated with the operating unit 21, or may be a device separated from the operating unit 21, such as 3D goggles (a head-mounted display). Meanwhile, the information processing device 20 may be a tablet terminal or a smartphone.

FIG. 2 illustrates an example of an image displayed on the monitor 22. Specifically, FIG. 2 illustrates a map image on which display of the current position of the mobile object 10 is superimposed. Reference sign Cp in FIG. 2 indicates the current position of the mobile object 10. Further, reference sign BL in FIG. 2 indicates a boundary line, and reference sign Nre indicates an entry unrecommended region.

The entry unrecommended region Nre indicates a region in which it might be difficult for the mobile object 10 to return to the predetermined return position due to energy shortage in a case where the mobile object 10 moves from the current position Cp and enters. Note that the return position is set to the position of the information processing device 20 being operated by the user in the present embodiment. However, the return position can be set as desired. The return position may be a charging point different from the position of the information processing device 20, for example.

The boundary line BL defines the entry unrecommended region Nre and the other region. The other region herein is the range on the boundary line BL or on the return position side of the boundary line BL (the side opposite from the side of the entry unrecommended region Nre), and corresponds to a "movement range" in which the mobile object 10 can return from the current position to the return position. As will be described later, candidate on-route points through which the mobile object 10 can return from the current position to the return position on the map are calculated on the basis of the amount of the energy remaining in the mobile object 10, and the movement range is specified on the basis of the candidate on-route points. In a case where the mobile object 10 returns to the return position via the candidate on-route points in the movement range, the mobile object 10 can return to the return position without causing energy shortage. In the present embodiment, the boundary line BL and the entry unrecommended region Nre are displayed on the monitor 22, so that the user can intuitively grasp the timing and the position (movement range) at which the mobile object 10 should return. Thus, it is possible to effectively prevent a situation in which the mobile object 10 fails to reach the predetermined return point. FIG. 3 shows block diagrams of both the mobile object 10 and the information processing device 20. In the description below, the mobile object 10 and the information processing device 20 are explained in detail.

(Mobile Object)

The mobile object 10 includes a communication unit 101, an airframe control unit 102, a battery 103, a self-position estimation unit 104, a map estimation unit 105, a route planning unit 106, an advance notification unit 107, and an imaging unit 112. The advance notification unit 107 includes a return position holding unit 108, a remaining energy amount acquisition unit 109, an energy calculation unit 110, and a range specifying unit 111.

The communication unit 101 transmits and receives information or data by performing wireless communication with the information processing device 20. The communication unit 101 receives, from the information processing device 20, a control command regarding flight, for example. The communication unit 101 receives the control command at constant sample time intervals, for example. The communication unit 101 provides the received control command to the airframe control unit 102. Also, the communication unit 101 can transmit, to the information processing device 20, information regarding the position and the moving state of the mobile object 10, the information being generated by the self-position estimation unit 104, the map estimation unit 105, and the advance notification unit 107. Further, the communication unit 101 can transmit an image (image data) captured by the imaging unit 112 to the information processing device 20.

The wireless communication method to be adopted by the communication unit 101 may be any appropriate method. For example, a communication method compliant with the IEEE 802.11 standard, the IEEE 802.15.1 standard, or some other standard may be adopted. The frequency band to be used for wireless communication is a 2.4 GHz band, a 5 GHz band, or some other frequency band, for example.

The airframe control unit 102 controls the entire mobile object 10. The airframe control unit 102 controls operation of the mobile object 10 in accordance with the control command received by the communication unit 101, for example. The mobile object 10 according to the present embodiment includes a plurality of rotors. In a case where the mobile object 10 is moved straight, for example, the airframe control unit 102 adjusts the rotational speeds of the plurality of rotors to incline the posture of the mobile object 10 forward and move the mobile object 10 forward. Also, the airframe control unit 102 uses the communication unit 101 to control processes related to transmission and reception of information or data to and from the information processing device 20.

The battery 103 stores the energy for driving the mobile object 10. Specifically, the battery 103 stores electrical energy, and can be charged in a wired or noncontact manner.

The self-position estimation unit 104 estimates the current position of the mobile object 10. Hereinafter, the current position of the mobile object 10 will be referred to simply as the position of the mobile object 10 in some cases. The self-position estimation unit 104 may be formed with a GPS receiver. In this case, the self-position estimation unit 104 receives a signal from a global positioning system (GPS) satellite, and detects the position of the mobile object 10 on the basis of the received signal. Positional information may indicate latitude and longitude. Alternatively, the positional information may be a three-axis coordinate system (XYZ coordinate system), such as (X, Y, Z)=(7.3 m, 4.1 m, 15.8 m), for example, with the position of the information processing device 20 being set as the origin or set to a predetermined position.

The map estimation unit 105 estimates map information about the surroundings of the mobile object 10, on the basis of the current position of the mobile object 10 estimated by the self-position estimation unit 104. The map estimation unit 105 according to the present embodiment holds wide-area map information, and estimates map information about the surroundings of the mobile object 10 on the basis of the wide-area map information. The wide-area map information preferably includes attribute information about rivers, mountains, fields, buildings, parks, flight prohibited areas, and the like in the region on the map. Further, the attribute information preferably includes the shapes and the above-sea levels of lands, the heights of buildings, and the like. The wide-area map information and the map information about the surrounding of the mobile object 10 extracted from the wide-area map information are information from which a map image can be generated in the present embodiment.

The route planning unit 106 generates a route to the target position, when a control command regarding movement to the target position determined relatively or absolutely with respect to the mobile object 10 is generated, for example. Also, the route planning unit 106 generates a route from the current position to the return position, when a control command for processing for autonomous return to home (RTH) is issued.

Further, the route planning unit 106 can generate a route for the mobile object 10 to return from the current position to the return position via a candidate point. The energy calculation unit 110 described later calculates the energy for returning to be consumed before the mobile object 10 returns from the current position to the return position via a candidate point that is different from the return position. The route via a candidate point to be used when the energy calculation unit 110 calculates the energy for returning is generated by the route planning unit 106.

The route planning unit 106 generates a route, using the current position of the mobile object 10 estimated by the self-position estimation unit 104, and the map information about the surroundings of the mobile object 10 estimated by the map estimation unit 105. The route generation algorithm adopted by the route planning unit 106 may be any generally used route generation algorithm, or may be obtained by adding an appropriate weight to such an algorithm.

The route planning unit 106 may refer to the information about mountains, buildings, and the like in map information, for example, and generate a route that avoids the obstacles. Also, the route planning unit 106 may generate a linear route. In a case where a linear route is generated, the mobile object 10 may detect obstacles during movement, and modify the route so as to avoid the obstacles.

The advance notification unit 107 has a function of generating information regarding the boundary line BL, the entry unrecommended region Nre, and the movement range on the opposite side from the entry unrecommended region Nre, which have been mentioned above. As described above, the advance notification unit 107 includes the return position holding unit 108, the remaining energy amount acquisition unit 109, the energy calculation unit 110, and the range specifying unit 111. The return position holding unit 108 holds the return position. The return position is set to the position of the information processing device 20 being operated by the user in the present embodiment. The return position may be rewritten in accordance with an instruction from the information processing device 20. The remaining energy amount acquisition unit 109 acquires the amount of the energy remaining in the battery 103.

As described above, the energy calculation unit 110 calculates the energy for returning to be consumed before the mobile object 10 returns from the current position to the return position via a candidate point that is different from the return position. The energy calculation unit 110 may calculate the energy for returning with respect to a plurality of candidate points defined in a two-dimensional plane, or may calculate the energy for returning with respect to a plurality of candidate points defined in a three-dimensional space. The energy calculation unit 110 according to the present embodiment calculates the energy for returning, with respect to a plurality of candidate points in a two-dimensional plane along a horizontal plane, for example.

As described above, the route on which calculation of the energy for returning is based is generated by the route planning unit 106. At this point of time, the value of the energy for returning can change depending on the algorithm for the route generation by the route planning unit 106. Furthermore, since the value of the energy for returning can change depending on environmental conditions such as tailwind and headwind with respect to the mobile object 10, the energy calculation unit 110 may increase or decrease the energy for returning calculated by detecting environmental conditions.

The range specifying unit 111 receives information about the energy for returning that corresponds to the plurality of candidate points and has been calculated by the energy calculation unit 110 as described above, and the amount of the energy remaining in the battery 103 as acquired by the remaining energy amount acquisition unit 109. The range specifying unit 111 then specifies a movement range in which the mobile object 10 can return from the position of the mobile object 10 to the return position, on the basis of the amount of the energy remaining in the mobile object 10. Specifically, the range specifying unit 111 calculates, on the basis of the remaining energy amount, candidate on-route points through which the mobile object 10 can return from the position of the mobile object 10 to the return position, and specifies the movement range on the basis of the candidate on-route points. More specifically, the range specifying unit 111 in the present embodiment specifies candidate points on a route where the energy for returning is equal to or lower than the remaining energy on the basis of the information about the energy for returning calculated by the energy calculation unit 110 and the amount of energy remaining in the battery 103 acquired by the remaining energy amount acquisition unit 109, and sets the specified candidate points as candidate on-route points through which the mobile object 10 can return to the return position. The range specifying unit 111 then specifies a movement range in which the mobile object 10 can return to the return position on the basis of the candidate on-route points, and, in the present embodiment, specifies the boundary of this movement range as the boundary where entry of the mobile object 10 is unrecommended or prohibited. The boundary of the movement range based on such candidate on-route points may be a boundary where the energy for returning is larger than the amount of the remaining energy (for convenience, the boundary is referred to as the marginal boundary). Alternatively, the boundary may be set on the return position side of the above marginal boundary.

In the present embodiment, the energy for returning is calculated with respect to a plurality of candidate points in a two-dimensional plane along the horizontal plane. Therefore, the boundary of the movement range specified by the range specifying unit 111 is specified as a boundary line continuous in the two-dimensional plane. That is, the range specifying unit 111 specifies the boundary line BL as illustrated in FIG. 2. The range specifying unit 111 then specifies a region on the side that is away from the boundary line BL with respect to the return position as the entry unrecommended region Nre as illustrated in FIG. 2.

Information regarding the boundary specified by the range specifying unit 111 as described above, the entry unrecommended area, and the movement range on the opposite side from the entry unrecommended region side is transmitted from the communication unit 101 to the information processing device 20 under the control of the airframe control unit 102. At this point of time, in the present embodiment, the current position of the mobile object 10 estimated by the self-position estimation unit 104, and the map information about the surroundings of the mobile object 10 estimated by the map estimation unit 105, which are the preconditions for specifying the boundary, are also transmitted to the information processing device 20. As a result, the boundary line BL and the entry unrecommended region Nre can be displayed on the information processing device 20 as illustrated in FIG. 2. Note that, once any one piece of the information regarding the boundary specified by the range specifying unit 111, the entry unrecommended region, and the movement range on the opposite side from the entry unrecommended region side is determined, the remaining information can be calculated. Therefore, the communication unit 101 may transmit any one piece of the information regarding the boundary specified by the range specifying unit 111, the entry unrecommended region, and the movement range on the opposite side from the entry unrecommended region side.

Alternatively, the information regarding the boundary and the entry unrecommended region, and the like may be transmitted to an external device different from the information processing device 20. Further, in the present embodiment, the boundary is specified on the basis of the candidate points on a route where the energy for returning is equal to or less than the amount of the remaining energy. In this case, the calculation load at the time of specifying the boundary can be reduced.

The advance notification unit 107 having the functions described above constantly performs a process of specifying the movement range, the boundary thereof, and the like as described above. In a case where the boundary line and the entry unrecommended region (or the movement range) are displayed by the information processing device 20, it becomes easier for the user to intuitively grasp the timing and the position at which the mobile object 10 should return, as described above. On the other hand, the mobile object 10 may perform a notification process such as changing the lighting mode of a light emitting unit attached to the mobile object 10 when the distance from the mobile object 10 to the boundary becomes equal to or shorter than a predetermined value, on the basis of the information of the above boundary specified sequentially. In this case, the user can recognize that the mobile object 10 is approaching the boundary, without visually checking the monitor 22.

(Information Processing Device)

The information processing device 20 includes the operating unit 21 and the monitor 22 described above (see FIG. 1), a communication unit 201, a user operation acquisition unit 202, a self-position acquisition unit 203, a map acquisition unit 204, a range acquisition unit 205, a map and boundary integration unit 206, and a map rendering unit 207.

The communication unit 201 transmits and receives information or data by performing wireless communication with the mobile object 10. For example, the communication unit 201 receives, from the mobile object 10, the above-described information regarding the boundary specified by the range specifying unit 111, the entry unrecommended region, and the movement range on the opposite side from the entry unrecommended region side, the information about the current position of the mobile object 10 estimated by the self-position estimation unit 104, the map information about the surroundings of the mobile object 10 estimated by the map estimation unit 105, and an image captured by the imaging unit 112. The communication unit 101 receives the control command at constant sample time intervals, for example.

The user operation acquisition unit 202 converts an operation performed on the operating unit 21 by the user into a control command, and supplies the control command to the communication unit 201. At this point of time, the communication unit 201 transmits, to the mobile object 10, a control command for the mobile object 10.

The self-position acquisition unit 203 receives the information about the current position of the mobile object 10 estimated by the self-position estimation unit 104 from the communication unit 201, and identifies the current position of the mobile object 10. The map acquisition unit 204 receives the map information about the surroundings of the mobile object 10 estimated by the map estimation unit 105 from the communication unit 201, and identifies the map information about the surroundings of the mobile object 10. The range acquisition unit 205 receives, from the communication unit 201, the information regarding the boundary specified by the range specifying unit 111, the entry unrecommended region, and the movement range on the opposite side from the entry unrecommended region side, and, in the present embodiment, specifies a boundary where entry of the mobile object 10 is unrecommended or a boundary where entry of the mobile object 10 is prohibited, and the entry unrecommended region corresponding to the boundary.

The map acquisition unit 204 of the present embodiment uses the map information about the surroundings of the mobile object 10 estimated by the map estimation unit 105, without making any change to it. Alternatively, the map acquisition unit 204 may hold wide-area map information different the map information to be estimated by the map estimation unit 105. In this case, the map acquisition unit 204 specifies the corresponding map information from the wide-area map information held therein, on the basis of the map information provided from the map estimation unit 105.

The map and boundary integration unit 206 integrates the current position of the mobile object 10 identified by the self-position acquisition unit 203 as described above, the map information about the surroundings of the mobile object 10 identified by the map acquisition unit 204, and the boundary specified by the range acquisition unit 205 and the entry unrecommended region corresponding to the boundary, and generates a map image (referred to as an advance notification image) in which the current position of the mobile object 10, the boundary, and the entry unrecommended region corresponding to the boundary are further displayed on the map image based on the map information.

The advance notification image generated by the map and boundary integration unit 206 is provided to the map rendering unit 207, and the map rendering unit 207 displays the advance notification image on the monitor 22. As a result, the boundary line BL and the entry unrecommended region Nre can be displayed on the monitor 22 of the information processing device 20 as illustrated in FIG. 2. Note that, in the present embodiment, the boundary line BL and the entry unrecommended region Nre are simultaneously displayed, but only the boundary line BL may be displayed, for example. Note that, as the boundary line BL and/or the entry unrecommended region Nre is displayed on the monitor 22, the user can also grasp the movement range in which the mobile object 10 can return from the current position to the return position.

<Example of a Process>

Next, an example of a process to be performed by the mobile object 10 in the information processing system S1 is described with reference to a flowchart shown in FIG. 4.

First, the mobile object 10 operates in response to a control command from the information processing device 20 (step S41). Next, the self-position estimation unit 104 estimates the current position of the mobile object 10, and the map estimation unit 105 estimates map information about the surroundings of the mobile object 10 on the basis of the current position of the mobile object 10. The map information about the surroundings of the mobile object 10 estimated by the map estimation unit 105 is then updated as the latest map information about the surroundings of the mobile object 10 (step S42). That is, here, in a case where there is a change in the relative positional relationship between the current position of the mobile object 10 and the map information, a new relative positional relationship is specified.

After that, the energy calculation unit 110 checks whether or not there is a candidate point for which the energy for returning of the mobile object 10 has not been calculated (step S43). Here, if there is a candidate point (YES in step S43), the energy calculation unit 110 calculates the energy for returning with respect to the uncalculated candidate point (step S44). After the calculation, the process returns to step S43. If there are no candidate points (NO in step S43), on the other hand, the remaining energy amount acquisition unit 109 acquires the amount of the energy remaining in the battery 103 (step S45). Note that, as described above, the energy for returning is the energy to be consumed before the mobile object 10 returns from the current position to the return position via a candidate point that is different from the return position.

Next, the range specifying unit 111 refers to the energy for returning that has been calculated by the energy calculation unit 110 with respect to a plurality of candidate points, and checks whether or not there are candidate points at which the energy for returning is equal to or less than the amount of energy remaining in the battery 103 (step S46). Here, if there are candidate points (YES in step S46), the range specifying unit 111 sets the candidate points at which the energy for returning is equal to or less than the amount of energy remaining in the battery 103 as candidate on-route points through which the mobile object 10 can return to the return position, and specifies the boundary line of the entry unrecommended region by connecting the candidate on-route points (step S47). Note that it can also be said that the boundary line of the movement range is specified in step S47.

After that, a check is made to determine whether or not the position of the mobile object 10 is on the return position side of the boundary (step S48). Further, if the mobile object 10 is on the return position side of the boundary (YES in step S48), the communication unit 101 transmits, to the information processing device 20, the information regarding the boundary (movement range) specified by the range specifying unit 111 and the entry unrecommended region, and the current position of the mobile object 10 estimated by the self-position estimation unit 104 and the map information about the surroundings of the mobile object 10 estimated by the map estimation unit 105, which are the preconditions for specifying the boundary (step S49). After that, the process returns to step S41, and the information about the boundary is updated.

If the position of the mobile object 10 is not on the return position side of the boundary (NO in step S48), on the other hand, a return-to-home process is forcibly performed. Further, if there are no candidate points at which the energy for returning is equal to or less than the amount of energy remaining in the battery 103 in step S46 (NO in step S46), the process moves on to step 49, and a process of transmitting information to the information processing device 20 is performed. At this point of time, information indicating that the entire region of the map image based on the map information is the entry unrecommended region, and any boundary is not present is transmitted. In this case, a return-to-home process is resultantly started (step S50).

As described above, in a case where the information regarding the boundary specified by the range specifying unit 111 and the entry unrecommended region, and the like are transmitted to the information processing device 20 in step S49, the self-position acquisition unit 203, the map acquisition unit 204, the range acquisition unit 205, the map and boundary integration unit 206, and the map rendering unit 207 in the information processing device 20 perform a display process with respect to the boundary line BL and the entry unrecommended region Nre as illustrated in FIG. 2.

In the embodiment described above, the mobile object 10 includes the remaining energy amount acquisition unit 109 that acquires the amount of energy remaining in the mobile object 10, and the range specifying unit 111 that specifies, on the basis of the amount of energy remaining in the mobile object 10, the movement range in which the mobile object 10 can return from the position of the mobile object 10 to the return position. The range specifying unit 111 specifies the above movement range, so that the boundary line of the movement range and the entry unrecommended region are specified as a result.

With this arrangement in the present embodiment, the movement range in which the mobile object 10 can move from the current position and return to the return position can be specified. In other words, it is possible to specify a range in which it is difficult for the mobile object 10 to return to the predetermined return position due to energy shortage in a case where the mobile object 10 moves from the current position and enters the range (which is the entry unrecommended region) Furthermore, information about such a movement range or the range in which the return is difficult is generated before the mobile object 10 goes beyond the boundary of the movement range or the range in which the return is difficult. Accordingly, it is possible to urge the user to prohibit movement across the boundary using an index that is the boundary of the movement range or the range in which the return is difficult, and urge the user to return within the range of the remaining battery amount. Thus, it is possible to effectively prevent a situation in which the mobile object 10 fails to reach the return position.

In particular, as the boundary line and the entry unrecommended region are displayed on the monitor 22 in the present embodiment, the user can easily intuitively grasp the timing and the position at which the mobile object 10 should return. Thus, it is possible to effectively prevent a situation in which the mobile object 10 fails to reach the predetermined return point.

Note that, in the above embodiment, an example in which the advance notification unit 107 is provided in the mobile object 10 has been described. However, the advance notification unit 107 may be provided in the information processing device 20 as illustrated in FIG. 5. In this case, the advance notification unit 107 in the information processing device 20 receives current position information, remaining battery level information, and the like from the mobile object 10, for example, so that the energy calculation unit 110 and the range specifying unit 111 can specify the movement range or the entry unrecommended boundary. Note that, in a case where the advance notification unit 107 is provided in the information processing device 20 as illustrated in FIG. 5, the advance notification unit 107 preferably includes the same route planning unit 106 as that of the mobile object 10.

Second Embodiment

Figure 6:
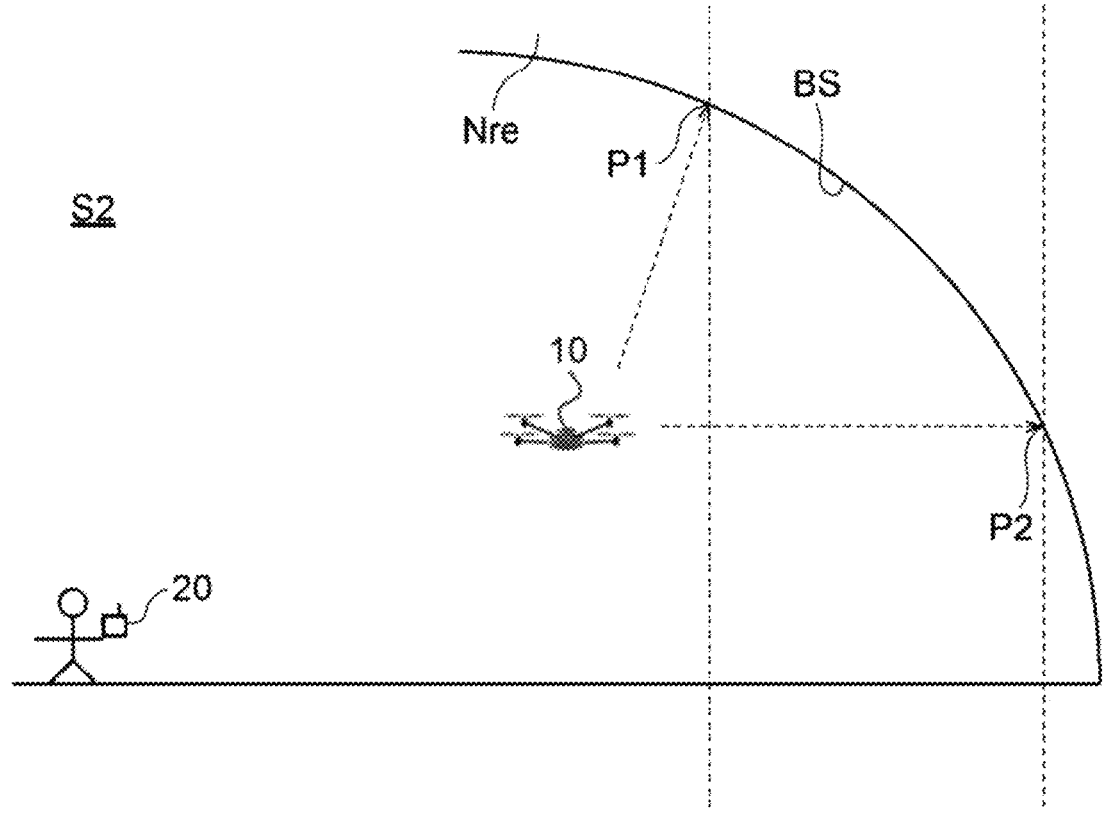
FIG. 6 is a conceptual diagram of a boundary defining an entry unrecommended region, the boundary being specified by an information processing system according to a second embodiment.

Next, an information processing system S2 according to a second embodiment is described. FIG. 6 is a conceptual diagram of a boundary defining an entry unrecommended region, the boundary being specified by the information processing system S2. FIG. 7 is block diagrams of a mobile object 10 and an information processing device 20 in the information processing system S2.

As illustrated in FIG. 6, the information processing system S2 includes the mobile object 10 and the information processing device 20 as in the first embodiment. Of the components in the present embodiment, the same components as those of the first embodiment are denoted by the same reference numerals as those used in the first embodiment, and explanation of them is not repeated herein.

In the first embodiment, when calculating the energy for returning, the energy calculation unit 110 may calculate the energy for returning with respect to a plurality of candidate points defined in a two-dimensional plane, or may calculate the energy for returning with respect to a plurality of candidate points defined in a three-dimensional space, as described above.

The energy calculation unit 110 according to the present embodiment calculates the energy for returning with respect to a plurality of candidate points defined in a three-dimensional space. On the basis of the result of calculation performed by the energy calculation unit 110, the range specifying unit 111 then specifies a boundary defining the entry unrecommended region, which is a boundary defining the movement range, as a boundary plane defined in the three-dimensional space. A boundary plane BS illustrated in FIG. 6 is an example of the boundary plane to be specified by the range specifying unit 111, and the boundary plane BS in three-dimensional representation is originally represented by a vertical coordinate system. The boundary plane to be specified may be a boundary (referred to as the marginal boundary, for convenience) on which the energy for returning becomes larger than the amount of the remaining energy. Alternatively, the boundary may be set on the return position side of this marginal boundary.

The map estimation unit 105 according to the present embodiment holds 3D wide-area map information. The route planning unit 106 uses the current position of the mobile object 10 estimated by the self-position estimation unit 104 and the map information about the surroundings of the mobile object 10 estimated by the map estimation unit 105, to generate a route for return energy calculation via a plurality of candidate points defined in a three-dimensional space.

As illustrated in FIG. 6, in the boundary plane BS defined in the three-dimensional space, an entry unrecommended region Nre taking into account the movement of the mobile object 10 in the vertical direction can be specified. In a case where the mobile object 10 moving forward and upward reaches a certain distance in the horizontal direction in the mobile object 10 moves straight forward and reaches certain distance, the energy consumed by the mobile object 10 is larger in a case where the movement involves upward movement. Therefore, a candidate on-route point P1 that is in the boundary plane BS and is located above and ahead of the mobile object 10 is located closer to the mobile object 10 than a candidate on-route point P2 that is in the boundary plane BS and is located straight ahead of the mobile object 10.

For example, in a case where only a boundary defined in a two-dimensional plane is specified, and the mobile object 10 is moved to the vicinity of the boundary while being moved upward or downward with the boundary serving as the index, there is a possibility that sufficient energy for returning is not ensured in some situations. On the other hand, in a case where a boundary plane defined in a three-dimensional space is specified, it is easy to prevent the mobile object 10 from entering the entry unrecommended region beforehand even when the mobile object 10 is moved upward or downward.

The information processing device 20 according to the present embodiment can also receive, from the mobile object 10, information about the boundary plane specified by the range specifying unit 111, and display the information on the monitor 22. At this point of time, the mobile object 10 may superimpose and display the boundary plane on an image captured by the imaging unit 112. Also, the information processing device 20 may display, on the monitor 22, an image obtained by superimposing the boundary plane on 3D map information about the surroundings of the mobile object 10, the 3D map information having being estimated by the map estimation unit 105 and received from the mobile object 10. Further, the information processing device 20 may display, on the monitor 22, a display image in which the boundary plane as illustrated in FIG. 6 is expressed in a vertical coordinate system, and a display image in which the boundary plane is expressed in a horizontal coordinate system, simultaneously or in a switching manner. The display process on the monitor 22 described above is performed by the map and boundary integration unit 206 and the map rendering unit 207.

Meanwhile, the information processing device 20 according to the present embodiment can also cut out and specify a two-dimensional boundary line from the boundary plane, on the basis of information about the boundary plane specified by the range specifying unit 111 and the information about the altitude of the mobile object 10. In doing so, the information processing device 20 uses information regarding the altitude of the mobile object 10, the information received from the mobile object 10. As illustrated in FIG. 7, the mobile object 10 includes an altimeter 113. The information processing device 20 includes an altitude acquisition unit 208 and a map dimension conversion unit 209.

The altimeter 113 acquires the altitude of the mobile object 10. The altimeter 113 may be a barometric altimeter, a radio altimeter, or a GPS receiver. The altimeter 113 supplies the acquired altitude of the mobile object 10 to the communication unit 101, and the communication unit 101 transmits the altitude information, together with information about the boundary plane specified by the range specifying unit 111, to the information processing device 20.

The altitude acquisition unit 208 receives the altitude information from the mobile object 10, and supplies the altitude information to the map dimension conversion unit 209. The map dimension conversion unit 209 acquires, from the range acquisition unit 205, the information about the boundary plane specified by the range specifying unit 111, and cuts out and specifies a two-dimensional boundary line from the boundary plane, on the basis of the information about the altitude of the mobile object 10.

The map dimension conversion unit 209 may cut out the intersection portion between the horizontal plane extending through the current altitude of the mobile object 10 and the boundary plane, as the boundary line. The map dimension conversion unit 209 may cut out, as the boundary line, the intersection portion between the horizontal plane extending through a predetermined altitude determined beforehand in accordance with a task such as an altitude inspection, and the boundary plane. The map dimension conversion unit 209 may cut out the boundary line from the boundary plane, on the basis of a history of altitude from the departure position to the current position. For example, the intersection between the horizontal plane extending through the average altitude based on the history and the boundary plane may be cut out as the boundary line. Alternatively, the map dimension conversion unit 209 may cut out, as the boundary line, the intersection portion between the boundary plane and the slope including the return position and the current position.

The map dimension conversion unit 209 supplies the boundary line specified as described above to the map and boundary integration unit 206. In this case, the map and boundary integration unit 206 integrates the current position of the mobile object 10 identified by the self-position acquisition unit 203, the map information (two-dimensional map information) about the surroundings of the mobile object 10 identified by the map acquisition unit 204, and the boundary line, to generate a map image (called an advance notification image) in which the current position of the mobile object 10, the boundary, and the entry unrecommended region corresponding to the boundary are displayed on a two-dimensional map image. The advance notification image generated by the map and boundary integration unit 206 is then supplied to the map rendering unit 207, and the map rendering unit 207 displays the advance notification image on the monitor 22.

Figure 8:
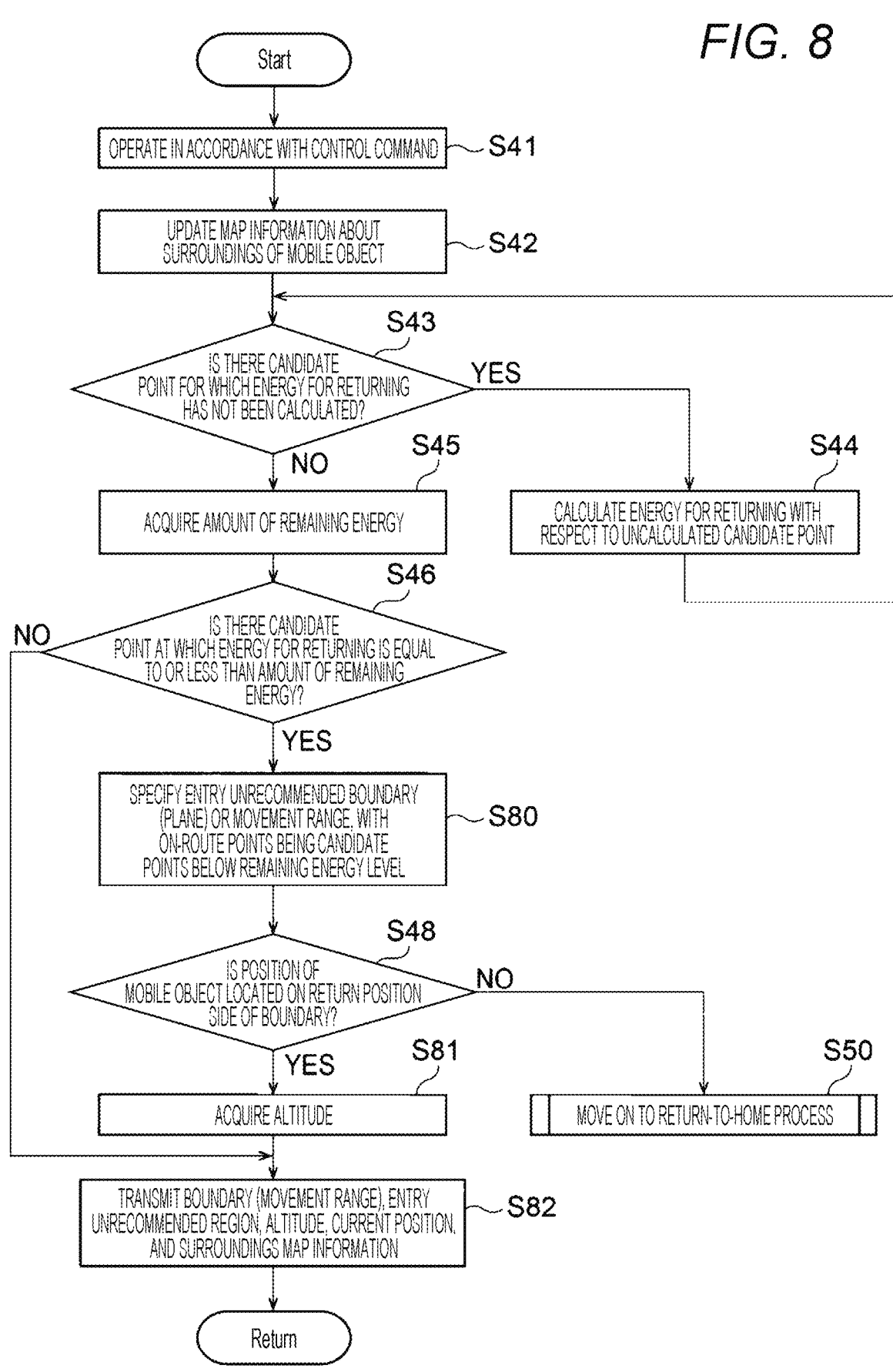
FIG. 8 is a flowchart illustrating an example of a process to be performed by the mobile object in the information processing system according to the second embodiment.

In the description below, an example of a process according to the second embodiment is explained, with reference to FIG. 8. FIG. 8 is a flowchart illustrating an example of a process to be performed by the mobile object 10.

In the present embodiment, the same process as that in the first embodiment is performed from step S41 to step S46. In step S46, the range specifying unit 111 then refers to the energy for returning that has been calculated by the energy calculation unit 110 with respect to a plurality of candidate points, and checks whether or not there is a candidate point at which the energy for returning is equal to or less than the amount of energy remaining in the battery 103. If it is determined in step S46 that there are candidate points, the range specifying unit 111 in step S80 then sets the candidate points at which the energy for returning is equal to or less than the amount of energy remaining in the battery 103 as candidate on-route points through which the mobile object 10 can return to the return position, and specifies the boundary plane by connecting the candidate on-route points.

After the range specifying unit 111 specifies the boundary plane, a check is then made to determine whether or not the position of the mobile object 10 is located on the return position side of the boundary (step S48). Further, if the mobile object 10 is located on the return position side of the boundary (YES in step S48), the advance notification unit 107 acquires information about the altitude of the mobile object 10 from the altimeter 113 (step S81). After that, the communication unit 101 transmits, to the information processing device 20, the information regarding the boundary plane (movement range) specified by the range specifying unit 111 and the entry unrecommended region, the current position of the mobile object 10 estimated by the self-position estimation unit 104 and the map information about the surroundings of the mobile object 10 estimated by the map estimation unit 105, which are the preconditions for specifying the boundary plane, and the information about the altitude of the mobile object 10 (step S82).

In a case where the information regarding the boundary plane and the like specified by the range specifying unit 111, the information about the altitude, and the like are transmitted to the information processing device 20 in step S82, the self-position acquisition unit 203, the map acquisition unit 204, the range acquisition unit 205, the altitude acquisition unit 208, the map dimension conversion unit 209, the map and boundary integration unit 206, and the map rendering unit 207 in the information processing device 20 can perform a process of displaying the boundary plane in three-dimensional representation or the boundary line in two-dimensional representation to be cut out from the boundary plane.

According to the present embodiment, the range in which it might be difficult for the mobile object 10 to return to a predetermined return position due to energy shortage in a case where the mobile object 10 moves from the current position and enters can be specified with a boundary plane in three-dimensional representation or a boundary line in two-dimensional representation. Furthermore, the boundary line in two-dimensional representation can be specified in a plurality of types of modes based on the altitude. Thus, the boundary can be accurately and flexibly presented to the user, for example, and a situation in which the mobile object 10 fails to reach the predetermined return point can be effectively prevented.

In particular, in the present embodiment, the information processing device 20 has a function of cutting out a boundary line in two-dimensional representation from a boundary plane in three-dimensional representation. Thus, it is possible to provide a system that is rational in terms of processing efficiency and practicality, for example.

Third Embodiment

Next, an information processing system S3 according to a third embodiment is described. FIG. 9 is a conceptual diagram of a boundary defining an entry unrecommended region, the boundary being specified by the information processing system S3. In the present embodiment, first, after a boundary line BL1 in a map image denoted by reference sign Im1 is specified, the boundary line BL1 is changed in a case where a predetermined condition is satisfied. A boundary line BL2 in a map image denoted by reference sign Im2 is then specified. In the boundary line BL2, a change for extending the boundary line BL1 has been made in a portion denoted by reference sign Ex. That is, the movement range in which a mobile object 10 can return to the return position is changed in a case where a predetermined condition is satisfied.

FIG. 10 is block diagrams of both the mobile object 10 and the information processing device 20 in the information processing system S3. The information processing system S3 includes the mobile object 10 and the information processing device 20, as in the first and second embodiments. Of the components in the present embodiment, the same components as those of the first and second embodiments are denoted by the same reference numerals as those used in the first and second embodiments, and explanation of them is not repeated herein.

The configuration of the mobile object 10 is the same as that of the first embodiment. Meanwhile, the information processing device 20 differs from that of the first embodiment in including a detailed map information acquisition unit 210. Also, the range acquisition unit 205 of the information processing device 20 differs from that of the first embodiment in having a function of changing the boundary line (movement range).

The detailed map information acquisition unit 210 holds detailed wide-area map information. The amount of information in the detailed wide-area map information is larger than the amount of information in the wide-area map information held by the map estimation unit 105 of the mobile object 10. In the detailed wide-area map information, attribute information about rivers, mountains, fields, buildings, parks, flight prohibited regions, and the like in a partial region included in the map information preferably include detailed information such as the shapes and the above-sea levels of the lands, and the heights of the buildings. Further, the detailed wide-area map information is preferably a data structure to which information can be added, or, in other words, a data structure in which a semantic map can be created.

The range acquisition unit 205 receives information regarding the boundary specified by the range specifying unit 111 of the mobile object 10, the entry unrecommended region, and the movement range located on the opposite side from the entry unrecommended region side, and specifies a boundary where entry of the mobile object 10 is unrecommended or a boundary where entry of the mobile object 10 is prohibited, and the entry unrecommended region corresponding to the boundary, as in the first embodiment. At this point of time, the range acquisition unit 205 according to the present embodiment acquires the attribute information about a region adjacent to the boundary on the return position side on the map on the basis of the detailed wide-area map information, and, in a case where the attribute information is classified as an unrecommended type in terms of entry, changes the boundary in accordance with the region corresponding to the attribute information classified as the unrecommended type. In other words, the initially specified movement range is changed depending on the region corresponding to attribute information classified as an unrecommended type. In the present embodiment, the boundary is changed so as to have a shape to avoid the region corresponding to attribute information classified into an unrecommended type on the return position side. The map and boundary integration unit 206 then generates a map image on the basis of the changed boundary.

Specifically, in a case where the boundary line BL2 illustrated in FIG. 9 is to be displayed, the range acquisition unit 205 first receives the boundary specified by the range specifying unit 111 of the mobile object 10, and map information, and specifies the boundary BL1 on which entry of the mobile object 10 is unrecommended or entry of the mobile object 10 is prohibited. The range acquisition unit 205 then acquires the attribute information about a region adjacent to the boundary BL1 on the return position side on the map, on the basis of the detailed wide-area map information. In the example illustrated in FIG. 9, a "river" is included in the attribute information about the region adjacent on the return position side on the map. Further, "river" as attribute information is classified as an unrecommended type in terms of entry. Therefore, the changed boundary line BL2 is formed by changing the boundary BL1 so as to have a shape to avoid the river, which is a region corresponding to attribute information classified as an unrecommended type, on the return position side, and is then extended.

Note that an adjacent region on the return position side on the map means a region in a range of a predetermined distance (for example, 500 m) from the boundary toward the return position side. Further, attribute information classified as unrecommended types in terms of entry includes the sea, lakes, ponds, forests, woods, wetlands, cliffs, buildings, and restricted areas, for example.

Figure 11:
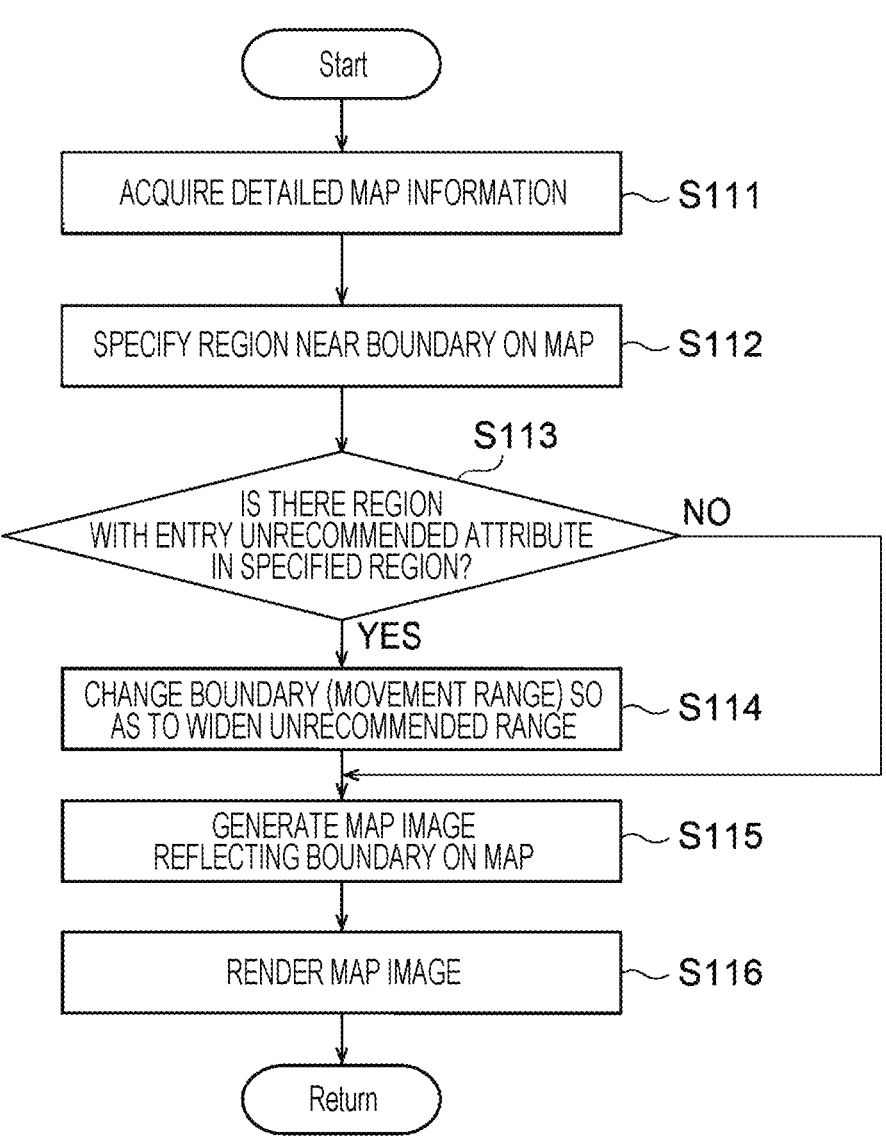
FIG. 11 is a flowchart illustrating an example of a process to be performed by the mobile object in the information processing system according to the third embodiment.

In the description below, an example of a process according to the third embodiment is explained, with reference to FIG. 11. FIG. 11 is a flowchart illustrating an example of a process to be performed by the information processing device 20.

When information for defining a boundary where entry of the mobile object 10 is not recommended (in other words, the boundary of the movement range) is generated, the communication unit 101 in the present embodiment also transmits, to the information processing device 20, the information regarding the boundary specified by the range specifying unit 111, the entry unrecommended region, and the movement range on the opposite side from the entry unrecommended region side, and the current position of the mobile object 10 estimated by the self-position estimation unit 104 and the map information about the surroundings of the mobile object 10 estimated by the map estimation unit 105, which are the preconditions for specifying the boundary. The process illustrated in FIG. 11 is started when the information processing device 20 receives these pieces of information, for example.

When the processing is started, the range acquisition unit 205 first acquires boundary information and map information from the mobile object 10 (step S111), and, in the present embodiment, a boundary where entry of the mobile object 10 is not recommended or a boundary where entry of the mobile object 10 is prohibited is specified on the basis of these pieces of acquired information. Subsequently, the range acquisition unit 205 acquires attribute information about a neighboring region adjacent to the specified boundary on the return position side on the map, on the basis of the detailed wide-area map information (step S112).

The range acquisition unit 205 then determines whether or not the attribute information acquired regarding the region on the map in step S112 is classified as an unrecommended type in terms of entry (step S113). In a case where the attribute information is classified as an unrecommended type, the range acquisition unit 205 changes the boundary (movement range) specified on the basis of the information acquired in step S111, in accordance with the region corresponding to the attribute information with which the boundary is classified as an unrecommended type (step S114).

After that, the map and boundary integration unit 206 integrates the current position of the mobile object 10 identified by the self-position acquisition unit 203, the map information about the surroundings of the mobile object 10 identified by the map acquisition unit 204, and the boundary (an unchanged or changed boundary) specified by the range acquisition unit 205 and the entry unrecommended region corresponding to the boundary, and generates a map image (referred to as an advance notification image) in which the current position of the mobile object 10, the boundary, and the entry unrecommended region corresponding to the boundary are further displayed on the map image based on the map information (step S115). A process of rendering the map image (the advance notification image) is then performed (step S116), and the process returns to step S111 and is repeated. Note that, in a case where the attribute information is not classified as an unrecommended type in step S113, the boundary without any change is used in step S115.

According to the present embodiment, the range acquisition unit 205 acquires the attribute information about a region adjacent to the specified boundary on the return position side on the map. In a case where the attribute information is classified as an unrecommended type in terms of entry, the range acquisition unit 205 then changes the boundary (movement range) in accordance with the region corresponding to the attribute information classified as an unrecommended type. Thus, it is possible to visually present, to the user in a user-friendly manner, the region in which it might be difficult for the mobile object 10 to return to a predetermined return position due to energy shortage in a case where the mobile object 10 moves from the current position and enters the region. As a result, a situation in which the mobile object 10 fails to reach the predetermined return point can be effectively prevented, and the user can efficiently use the amount of remaining energy.

For example, in the example illustrated in FIG. 9, the changed boundary line BL2 is formed by changing the boundary BL1 so as to have a shape to avoid a river that is a region corresponding to attribute information classified as an unrecommended type, on the return position side. In this case, the user can visually determine that the user is unable to cross the river with the amount of the current remaining energy. Further, in a case where a flight for inspection is being performed, for example, it is possible to efficiently use the amount of remaining energy by inspecting other regions while avoiding the inspection of the region near the river.

Note that the range acquisition unit 205 may change the boundary on the basis of observation information such as a captured image. For example, the range acquisition unit 205 may specify a region adjacent to the boundary on the return position side on the basis of an image captured by the imaging unit 112 of the mobile object 10, and, in a case where the attribute information about the specified region and/or an object included in the region is classified as an unrecommended type in terms of entry, the range acquisition unit 205 may change the boundary in accordance with the region corresponding to the attribute information classified as an unrecommended type.

Examples of regions to be specified on the basis of an image and be classified as an unrecommended type may include the sea, lakes, ponds, forests, woods, wetlands, cliffs, buildings, and the like. Examples of objects to be identified on the basis of an image may include dynamic objects such as pedestrians and automobiles.

Meanwhile, determination as to whether or not the attribute information about a region and/or the attribute information about an object included in the region is classified as an unrecommended type in terms of entry may be made with the use of a height difference between regions, identification information about a road (a crosswalk or the like), information about a traffic sign, a type (a shop name) of a building in the region, real-time observation information (the ebb and flow of the tide, or a rise of a river) that can form a semantic map, or the like.

Note that the range specifying unit 111 of the mobile object 10 may change the boundary (movement range) on the basis of attribute information about a specified region or the like on the map. In this case, the range specifying unit 111 acquires the attribute information about a region adjacent to the boundary specified by the range specifying unit 111 on the return position side on the map, on the basis of the map information held by the range specifying unit 111. In a case where the attribute information is classified as an unrecommended type in terms of entry, the range specifying unit 111 may then change the boundary (movement range) in accordance with the region corresponding to the attribute information classified as an unrecommended type. Also, the range specifying unit 111 may specify a region adjacent to the boundary on the return position side on the basis of an image captured by the imaging unit 112, and, in a case where the attribute information about the specified region and/or an object included in the region is classified as an unrecommended type in terms of entry, the range specifying unit 111 may change the boundary (movement range) in accordance with the region corresponding to the attribute information classified as an unrecommended type.

Note that the boundary change process according to the present embodiment can also be applied in a case where a three-dimensional boundary plane is specified.

Fourth Embodiment

Next, an information processing system S4 according to a fourth embodiment is described. FIG. 12 is block diagrams of both a mobile object 10 and an information processing device 20 in the information processing system S4. The information processing system S4 includes the mobile object 10 and the information processing device 20, as in the first to third embodiments. Of the components in the present embodiment, the same components as those of the first to third embodiments are denoted by the same reference numerals as those used in the first to third embodiments, and explanation of them is not repeated herein.

The configuration of the mobile object 10 is the same as that of the third embodiment. Meanwhile, the information processing device 20 differs from that of the third embodiment in further including an operation rejection unit 211 and a rejection notification unit 212. The operation rejection unit 211 uses a control command generated by the user operation acquisition unit 202 and a boundary specified by the range acquisition unit 205, and, in a case where the control command is beyond the boundary, the operation rejection unit 211 rejects the control command. In a case where a control command is rejected, the rejection notification unit 212 notifies the monitor 22 of the rejection, for example.

Figure 13:
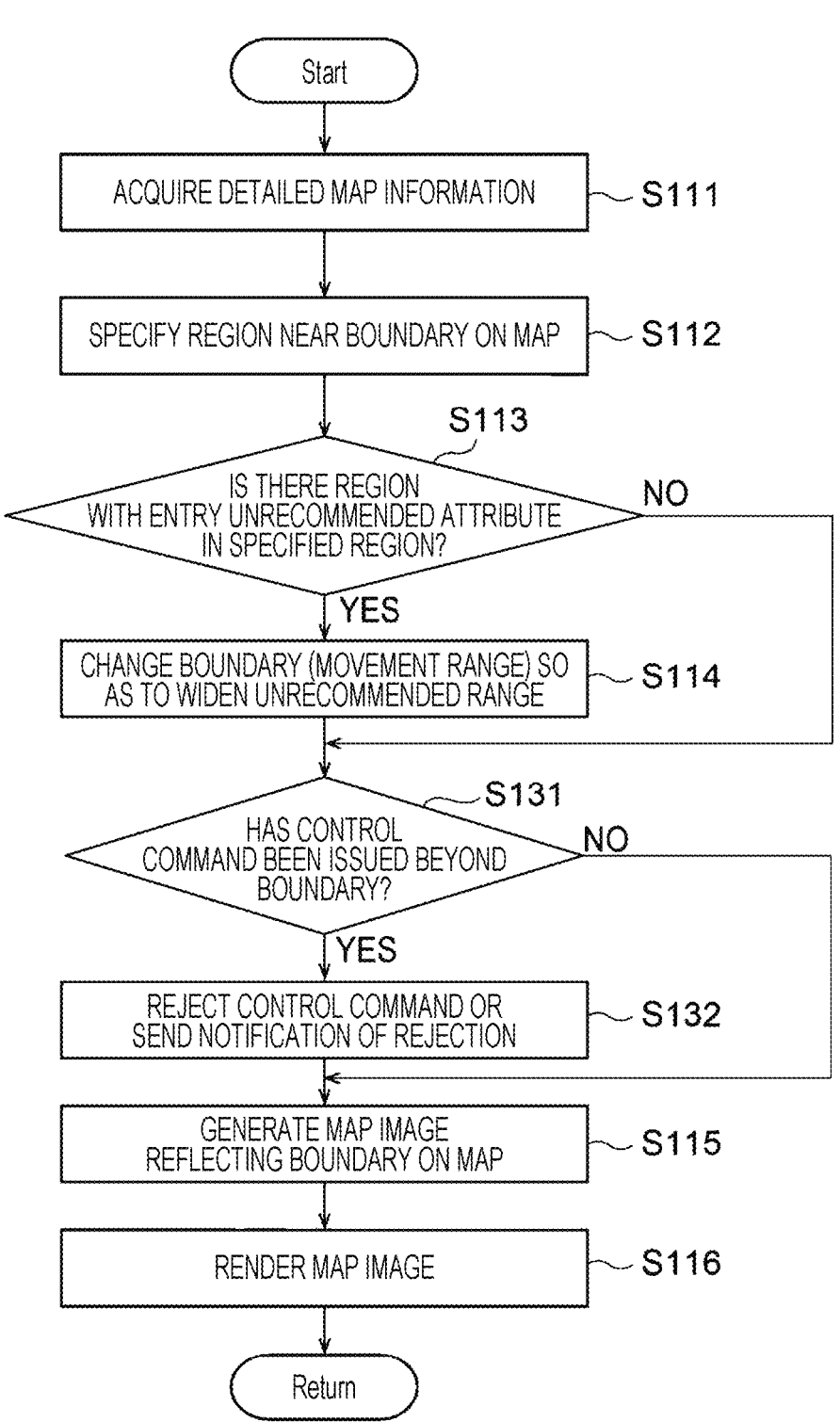
FIG. 13 is a flowchart illustrating an example of a process to be performed by the mobile object in the information processing system according to the fourth embodiment.

In the description below, an example of a process according to the fourth embodiment is explained, with reference to FIG. 13. FIG. 13 is a flowchart illustrating an example of a process to be performed by the information processing device 20.

In the present embodiment, the same process as that in the third embodiment is performed from step S111 to step S114. After the process of changing the boundary as necessary is performed, a check is then made to determine in step S131 whether or not a control command beyond the boundary has been issued. If the control command beyond the boundary has been issued (YES in step S131), the control command is then rejected, and a notification of the rejection is issued in step S132. After that, the same process as that in steps S115 and S116 described in the third embodiment is performed.

According to the present embodiment, in a case where a control command beyond the boundary is generated, the control command is forcibly rejected. Furthermore, the user can recognize, through a notification, that the control command has been rejected. Because of this, it is possible to effectively prevent a situation in which the mobile object 10 fails to reach the predetermined return point.

Fifth Embodiment

Figure 14A:
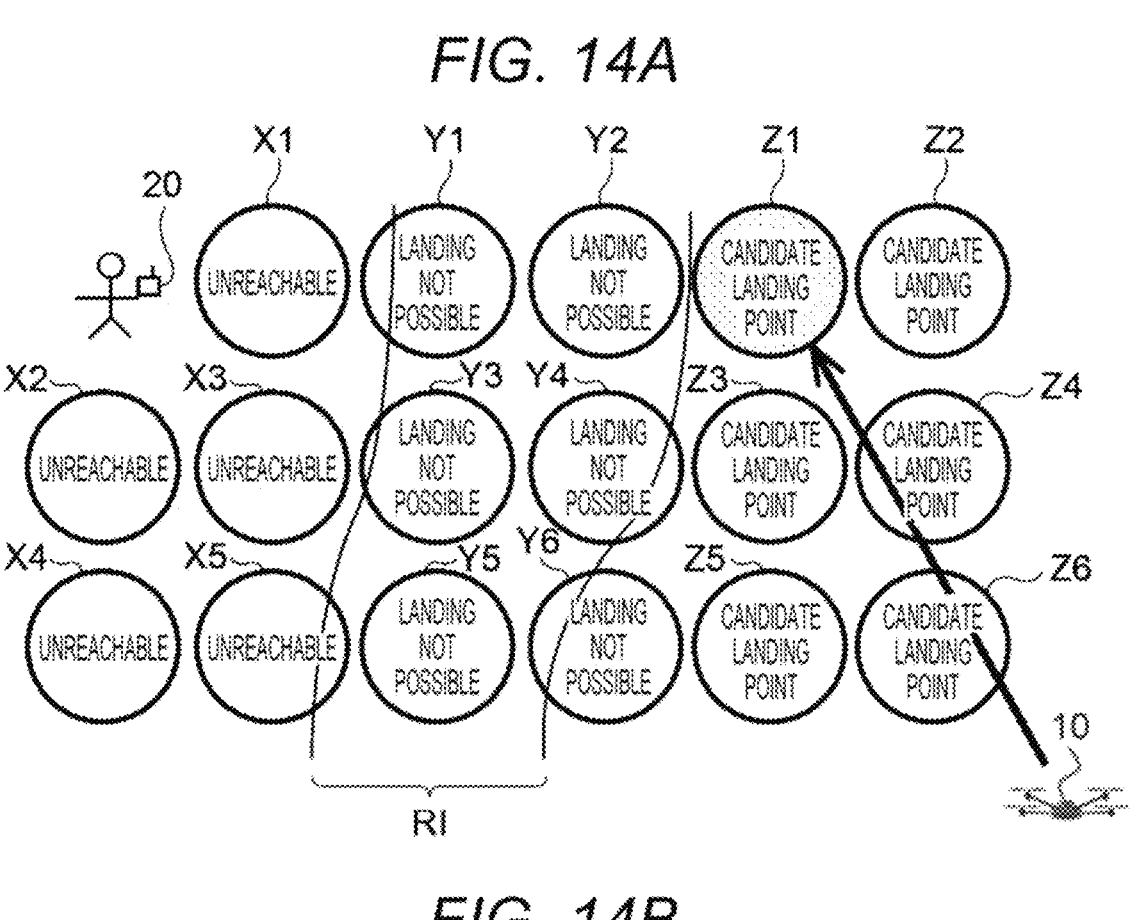
FIG. 14A is a conceptual diagram of an example of a process related to a route change to be performed by an information processing system according to a fifth embodiment.
Figure 14B:
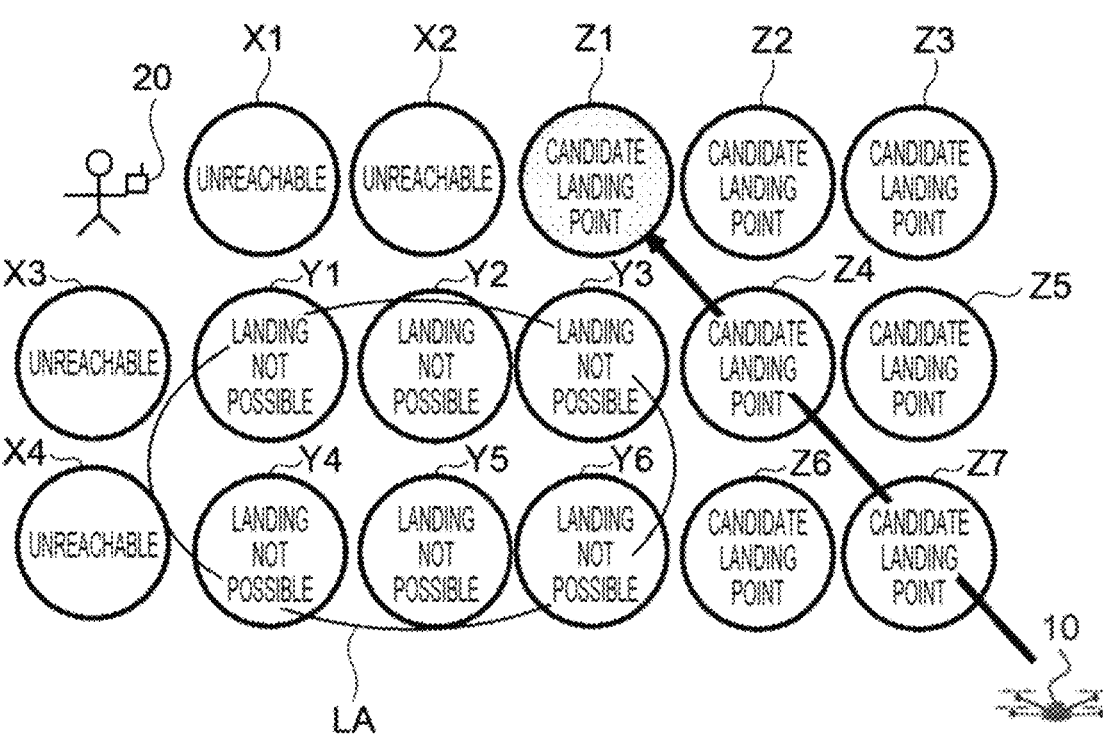
FIG. 14B is a conceptual diagram of another example of a process related to a route change to be performed by the information processing system according to the fifth embodiment.

Next, an information processing system S5 according to a fifth embodiment is described. FIGS. 14A and 14B are conceptual diagrams of an example of a process related to a route change performed by the information processing system S5. In the present embodiment, in a case where it is determined during a return-to-home process that the remaining battery level falls below the energy required to return to the return position, or in a case where it is determined that returning is difficult, a process of changing the route before landing is performed.

FIG. 14A illustrates a state in which it is difficult to return to the return position at which the information processing device 20 is located, and the route during the return-to-home process is changed to a route in which a candidate landing point Z1 among candidate landing points Z1 to Z6 as a plurality of candidate arrival points is set as the target position. In FIG. 14A, a region in which a river RI is located is determined to be landing prohibited points, and is excluded from the candidate landing points. FIG. 14B illustrates a state in which it is difficult to return to the return position at which the information processing device 20 is located, and the route during the return-to-home process is changed to a route in which a candidate landing point Z1 among a plurality of candidate landing points Z1 to Z7 is set as the target position. In FIG. 14B, a region in which a lake LA is located is determined to be landing prohibited points, and is excluded from the candidate landing points.

FIG. 15 is block diagrams of both the mobile object 10 and the information processing device 20 in the information processing system S5. The information processing system S5 includes the mobile object 10 and the information processing device 20, as in the first to fourth embodiments. Of the components in the present embodiment, the same components as those of the first to fourth embodiments are denoted by the same reference numerals as those used in the first to fourth embodiments, and explanation of them is not repeated herein. As means for changing the above route, the mobile object 10 includes a route change unit 120 that includes a candidate landing point calculation unit 114, a landing point calculation unit 115, and a landing control unit 116. Meanwhile, the information processing device 20 has the same configuration as that of the first embodiment.

The candidate landing point calculation unit 114 acquires map information about the current surroundings of the mobile object 10 estimated by the map estimation unit 105, and identifies candidate landing points. At this point of time, landing unrecommended or difficult points such as a river and a pond as described with reference to FIGS. 14A and 14B are excluded from the candidate landing points, on the basis of the attribute information about the regions included in the map information. The attribute information about landing unrecommended or difficult points may include the sea, lakes, ponds, forests, woods, wetlands, cliffs, buildings, and the like. Also, in determining the candidate landing points, information about dynamic objects such as pedestrians and automobiles that are specified on the basis of an image may be used, for example. Further, in determining the candidate landing points, a height difference between regions, identification information about a road (a crosswalk or the like), information about a traffic sign, the type (a shop name) of a building in the region, real-time observation information (the ebb and flow of the tide, or a rise of a river) that can form a semantic map, or the like may be used.

The landing point calculation unit 115 acquires the current amount of energy remaining in the mobile object 10 from the energy calculation unit 110, and changes each point that cannot be reached due to energy shortage among the candidate landing points specified by the candidate landing point calculation unit 114, to an unreachable point. Also, the landing point calculation unit 115 in the present embodiment sets the candidate landing point closest to the return position among the candidate landing points excluding the unreachable points, as the target position.

The landing control unit 116 then generates a route to the target position determined by the landing point calculation unit 115, and provides the airframe control unit 102 with a control command regarding a landing operation of the mobile object 10 when the mobile object 10 reaches the vicinity of the target position.

Figure 16:
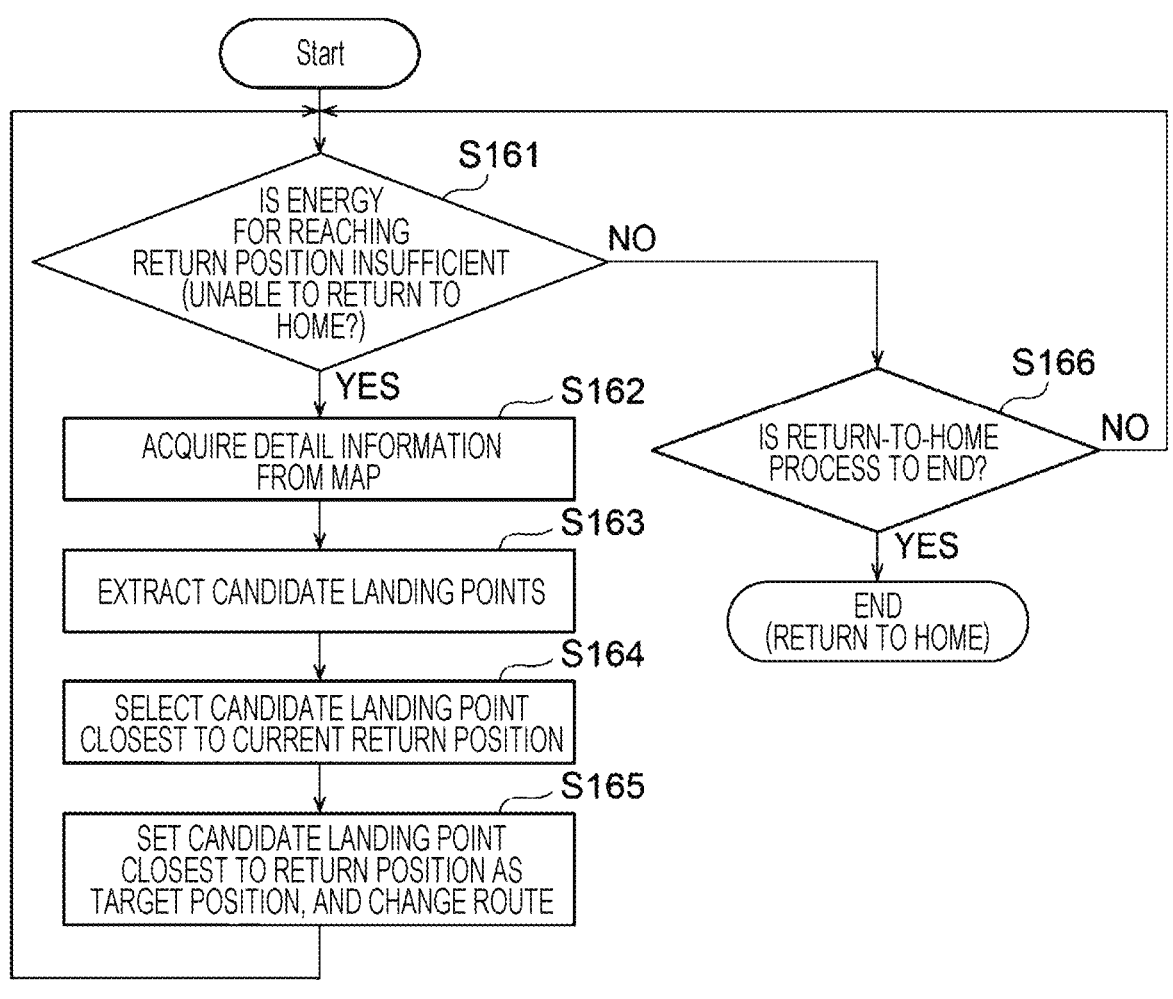
FIG. 16 is a flowchart illustrating an example of a process related to a route change to be performed in the information processing system according to the fifth embodiment.

In the description below, an example of a process according to the fifth embodiment is explained, with reference to FIG. 16. FIG. 16 is a flowchart illustrating an example of a process to be performed by the mobile object 10. The process illustrated in FIG. 16 is constantly performed during a return-to-home process.

First, the energy calculation unit 110 determines whether or not the amount of the current remaining energy is insufficient to reach the return position (step S161). Specifically, during movement to the return position, the energy calculation unit 110 calculates the energy to be consumed before reaching the return position (the energy will be hereinafter referred to as the direct return energy), and, in a case where the direct return energy becomes larger than the amount of remaining energy during the movement to the return position (in other words, where the amount of remaining energy falls below the direct return energy), the energy calculation unit 110 determines that the amount of remaining energy is insufficient to reach the return position. If the amount of remaining energy is determined to be insufficient herein (YES in step S161), the candidate landing point calculation unit 114 then acquires map information about the current surroundings of the mobile object 10 estimated by the map estimation unit 105 (step S162), and specifies candidate landing points based on the map information (step S163).

Subsequently, the landing point calculation unit 115 acquires the current amount of energy remaining in the mobile object 10 from the energy calculation unit 110, and changes each point that cannot be reached due to energy shortage among the candidate landing points specified by the candidate landing point calculation unit 114, to an unreachable point. The landing point calculation unit 115 then selects and sets the candidate landing point closest to the return position among the candidate landing points excluding the unreachable points, as the target position (step S164).

The landing control unit 116 then generates a route to the target position determined by the landing point calculation unit 115 (step S165). The process then returns to step S161. If the amount of remaining energy is determined not to be insufficient to reach the return position in step S161 (NO in step S161), a check is made to determine whether or not the return-to-home process is to end (step S166). If the return-to-home process is not to end yet, the process returns to step S161. Note that, in a case where the route is changed in step S165, a check is made to determine, in step S161, whether or not the remaining energy amount is insufficient to reach the target position after the route change. After that, in step S166, a check is made to determine whether or not the process of moving to the target position is to end.

In the present embodiment, in a case where the direct return energy becomes larger than the remaining energy amount during movement to the return position, the route change unit 120 specifies a plurality of candidate landing points, and specifies a route to the candidate landing point closest to the return position among the plurality of candidate landing points. The route change unit 120 then specifies candidate landing points, on the basis of attribute information about the regions on the map, observation information (semantics) about the surroundings of the mobile object 10, and the like. Thus, the mobile object 10 can safely reach the predetermined position. In particular, since the route to the candidate landing point closest to the return position is specified, the workload in retrieving the mobile object 10 after landing can be reduced.

<Hardware Configuration>

Figure 17:
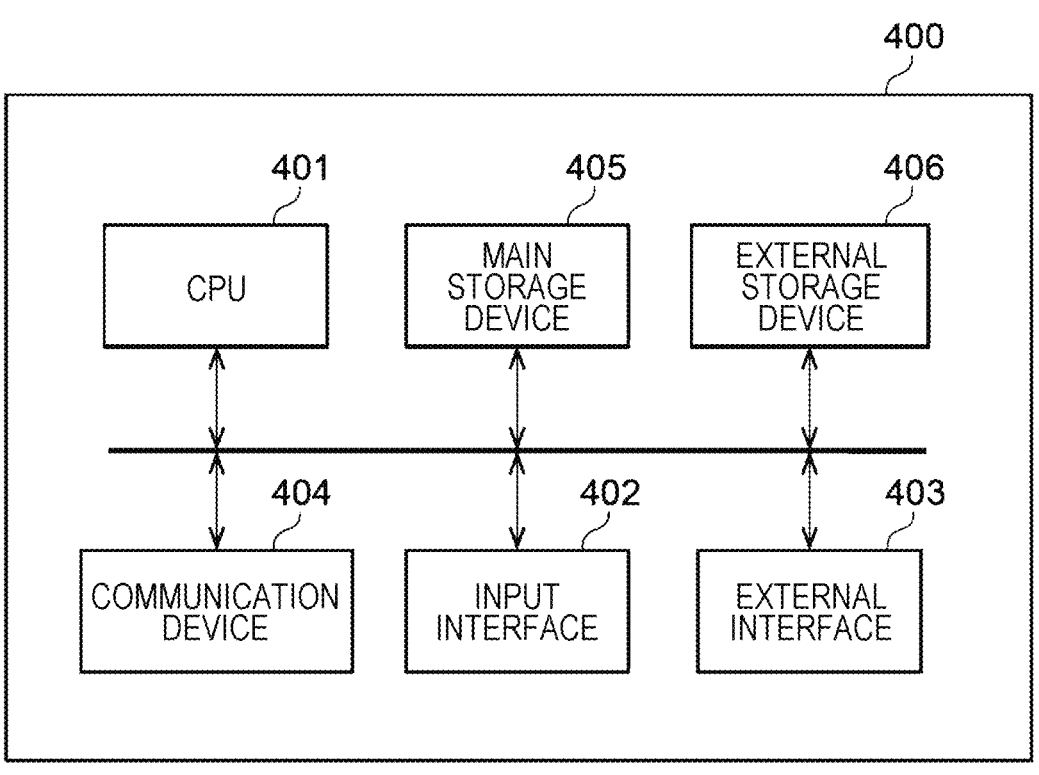
FIG. 17 is a diagram illustrating an example of the hardware configuration of an information processing apparatus that can include an information processing device and a mobile object according to an embodiment.

FIG. 17 illustrates an example of the hardware configuration of the mobile object 10 or the information processing device 20. The mobile object 10 or the information processing device 20 includes a computer device 400. The computer device 400 includes a central processing unit (CPU) 401, an input interface 402, an external interface 403, a communication device 404, a main storage device 405, and an external storage device 406, and there components are interconnected by a bus. At least one of these components may not be included in the mobile object 10 or the information processing device 20.

The central processing unit (CPU) 401 executes a computer program in the main storage device 405. The computer program is a program for implementing each of the above-described functional components of the mobile object 10 or the information processing device 20. The computer program may not be formed with one program, but may be formed with a combination of a plurality of programs and scripts. The CPU 401 executes the computer program to implement each of the functional components.

The input interface 402 is a circuit for inputting an operation signal to the mobile object 10 or the information processing device 20 from an input device such as a keyboard, a mouse, or a touch panel.

The external interface 403 displays, on a display device, data stored in the mobile object 10 or the information processing device 20, or data calculated by the mobile object 10 or the information processing device 20, for example. The external interface 403 may be connected to a liquid crystal display (LCD), an organic electroluminescence display, a cathode ray tube (CRT), or a plasma display (PDP), for example.

The communication device 404 is a circuit for the mobile object 10 or the information processing device 20 to communicate with an external device by wire or wirelessly. Data to be used in the mobile object 10 or the information processing device 20 can be input from an external device via the communication device 404. The communication device 404 includes an antenna. Data that has been input from an external device can be stored into the main storage device 405 or the external storage device 406. The communication units 101 and 201 described above may be formed with the communication device 404.

The main storage device 405 stores a computer program, data necessary for executing the computer program, data generated as a result of execution of the computer program, and the like. The computer program is loaded into and executed in the main storage device 405. The main storage device 405 is a RAM, a DRAM, or an SRAM, for example, but is not limited to this. A storage unit for information and data in the mobile object 10 or the information processing device 20 may be formed in the main storage device 405.

The external storage device 406 stores a computer program, data necessary for executing the computer program, data generated as a result of execution of the computer program, and the like. The computer program and the data are read into the main storage device 405 when the computer program is executed. The external storage device 406 is a hard disk, an optical disk, a flash memory, or a magnetic tape, for example, but is not limited to this.

Note that the computer program may be installed in the computer device 400 in advance, or may be stored in a storage medium such as a CD-ROM. Alternatively, the computer program may be uploaded on the Internet.

Further, the computer device 400 may be formed with a single device, or may be formed as a system including a plurality of computer devices connected to one another.

Note that the embodiments described above illustrate examples for embodying the present disclosure, and the present disclosure can be implemented in various other modes. For example, various modifications, substitutions, omissions, or combinations thereof can be made without departing from the gist of the present disclosure. Such modifications, substitutions, omissions, and the like are also included in the scope of the present disclosure, and are similarly included in the inventions disclosed in the claims and the equivalents thereof.

Furthermore, the effects of the present disclosure described in the present specification are merely an example, and other effects may be achieved.

Note that the present disclosure can also have the following configurations.

[Item 1]

A mobile object including:

a remaining energy amount acquisition unit that acquires the amount of energy remaining in the mobile object; and a range specifying unit that specifies a movement range in which the mobile object can return from the position of the mobile object to a return position, on the basis of the amount of energy remaining in the mobile object.

[Item 2]

The mobile object according to item 1, in which the range specifying unit calculates, on the basis of the amount of remaining energy, a candidate on-route point through which the mobile object can return from the position of the mobile object to the return position, and specifies the movement range on the basis of the candidate on-route point.

[Item 3]

The mobile object according to item 2, in which the candidate on-route point is a point at which energy for returning to be consumed by the mobile object to return to the return position when the mobile object has passed through the candidate on-route point is equal to or less than the amount of remaining energy.

[Item 4]

The mobile object according to item 3, further including an energy calculation unit that calculates the energy for returning, on the basis of the position of the mobile object.

[Item 5]

The mobile object according to any one of items 1 to 4, in which the range specifying unit sets a boundary of the movement range as a boundary where entry of the mobile object is unrecommended or prohibited.

[Item 6]

The mobile object according to any one of items 1 to 5, further including a communication unit that transmits information about the movement range specified by the range specifying unit, to an external device.

[Item 7]

The mobile object according to any one of items 1 to 5, in which the mobile object is operated by an operating device, and the mobile object further includes a communication unit that transmits information about the movement range specified by the range specifying unit, to the operating device.

[Item 8]

The mobile object according to any one of items 1 to 7, in which the range specifying unit acquires attribute information about a region adjacent to a boundary of the movement range on the return position side on a map, and, when the attribute information is classified as an unrecommended type in terms of entry, changes the movement range in accordance with the region corresponding to the attribute information classified as the unrecommended type.

[Item 9]

The mobile object according to any one of items 1 to 7, further including an imaging unit that captures an image of surroundings of the mobile object, in which the range specifying unit specifies a region adjacent to a boundary of the movement range on the return position side on the basis of the image captured by the imaging unit, and, when attribute information about the specified region and/or an object included in the region is classified as an unrecommended type in terms of entry, changes the movement range in accordance with the region corresponding to the attribute information classified as the unrecommended type and/or the region including the object.

[Item 10]

The mobile object according to any one of items 1 to 9, in which the mobile object is a flying object, and the range specifying unit specifies the movement range as a plane that is defined in a three-dimensional space.

[Item 11]

The mobile object according to item 10, further including:

an altimeter that acquires an altitude of the mobile object; and a communication unit that transmits, to an external device, information about the movement range specified by the range specifying unit, and information about the altitude acquired by the altimeter.

[Item 12]

The mobile object according to any one of items 1 to 11, in which, when crossing the movement range to a side on which the mobile object moves away from the return position, the mobile object forcibly starts moving to the return position.

[Item 13]

The mobile object according to any one of items 1 to 12, in which, when a control command for causing the mobile object to cross the movement range to a side on which the mobile object moves away from the return position is issued, the control command is rejected.

[Item 14]

The mobile object according to any one of items 1 to 13, further including:

a route planning unit that determines a route to the return position, when control to move the mobile object to the return position is activated in accordance with a control command from a user or in a forcible manner; and a route change unit that changes the route determined by the route planning unit, in which, when direct return energy to be consumed for movement to the return position becomes larger than the amount of energy remaining in the mobile object during movement to the return position along the route determined by the route planning unit, the route change unit specifies a plurality of candidate arrival points, and specifies a route to the candidate arrival point closest to the return position among the plurality of candidate arrival points.

[Item 15]

The mobile object according to item 14, in which the route change unit specifies the candidate arrival points, on the basis of attribute information about a region on a map and observation information about surroundings of the mobile object.

[Item 16]

An information processing method including:

a step of acquiring the amount of energy remaining in a mobile object; and a step of specifying a movement range in which the mobile object can return from the position of the mobile object to a return position, on the basis of the amount of energy remaining in the mobile object.

[Item 17]

An information processing system including:

a mobile object:

a remaining energy amount acquisition unit that acquires the amount of energy remaining in the mobile object;

26 a range specifying unit that specifies a movement range in which the mobile object can return from the position of the mobile object to a return position, on the basis of the amount of energy remaining in the mobile object; and a map rendering unit that displays the movement range superimposed on a map image.

[Item 18]

A computer program for causing a computer to carry out:

a step of acquiring the amount of energy remaining in a mobile object; and a step of specifying a movement range in which the mobile object can return from the position of the mobile object to a return position, on the basis of the amount of energy remaining in the mobile object.

| REFERENCE SIGNS LIST | |
|---|---|
| S1, S2, S3, S4, S5 | Information processing system |
| 10 | Mobile object |
| 101 | Communication unit |
| 102 | Airframe control unit |
| 103 | Battery |
| 104 | Self-position estimation unit |
| 105 | Map estimation unit |
| 106 | Route planning unit |
| 107 | Advance notification unit |
| 108 | Return position holding unit |
| 109 | Remaining energy amount acquisition unit |
| 110 | Energy calculation unit |
| 111 | Range specifying unit |
| 112 | Imaging unit |
| 113 | Altimeter |
| 114 | Candidate landing point calculation unit |
| 115 | Landing point calculation unit |
| 116 | Landing control unit |
| 120 | Route change unit |
| 20 | Information processing device |
| 21 | Operating unit |
| 22 | Monitor |
| 201 | Communication unit |
| 202 | User operation acquisition unit |
| 203 | Self-position acquisition unit |
| 204 | Map acquisition unit |
| 205 | Range acquisition unit |
| 206 | Map and boundary integration unit |
| 207 | Map rendering unit |
| 208 | Altitude acquisition unit |
| 209 | Map dimension conversion unit |
| 210 | Detailed map information acquisition unit |
| 211 | Operation rejection unit |
| 212 | Rejection notification unit |
| 400 | Computer device |
| 401 | CPU |
| 402 | Input interface |
| 403 | External interface |
| 404 | Communication device |
| 405 | Main storage device |
| 406 | External storage device |

The invention claimed is:

1. A mobile object comprising:

circuitry including a processor that is configured to acquire an amount of energy remaining in the mobile object;

specify a movement range in which the mobile object is able to return from a position of the mobile object to a return position, based on the amount of energy remaining in the mobile object;

acquire attribute information about a region adjacent to a boundary of the movement range on a side of the return position on a map; and when the attribute information is classified as an unrecommended type in terms of entry, change the movement range in accordance with the region corresponding to the attribute information classified as the unrecommended type.

2. The mobile object according to claim 1, wherein the range specifying unit calculates, circuitry is further configured to calculate, based on the amount of remaining energy, a candidate on-route point through which the mobile object is able to return from the position of the mobile object to the return position, and specify the movement range based on the candidate on-route point.

3. The mobile object according to claim 2, wherein the candidate on-route point is a point at which energy for returning to be consumed by the mobile object to return to the return position through the candidate on-route point is not greater than the amount of remaining energy.

4. The mobile object according to claim 3, wherein the circuitry is further configured to calculate the energy for returning, based on the position of the mobile object.

5. The mobile object according to claim 1, wherein the circuitry is further configured to set the boundary of the movement range as a boundary where entry of the mobile object is unrecommended or prohibited.

6. The mobile object according to claim 1, wherein the circuitry is further configured to transmit information about the movement range that was specified, to an external device.

7. The mobile object according to claim 1, wherein the mobile object is operated by an operating device, and the circuitry is further configured to transmit information about the movement range that was specified, to the operating device.

8. The mobile object according to claim 1, further comprising an imager that captures an image of surroundings of the mobile object, wherein the circuitry is further configured to specify the region adjacent to the boundary of the movement range on the side of the return position based on the image captured by the imager, and when attribute information about the region that was specified and/or an object included in the region is classified as the unrecommended type in terms of entry, change the movement range in accordance with the region corresponding to the attribute information classified as the unrecommended type and/or the region including the object.

9. The mobile object according to claim 1, wherein the mobile object includes a flying object, and the circuitry is further configured to specify the movement range as a plane that is defined in a three-dimensional space.

10. The mobile object according to claim 9, further comprising:

an altimeter that acquires an altitude of the mobile object, wherein the circuitry is further configured to transmit, to an external device, information about the movement range that was specified, and information about the altitude acquired by the altimeter.

11. The mobile object according to claim 1, wherein when the mobile object crosses the movement range to a side on which the mobile object moves away from the return position, the circuitry is further configured to control the mobile object to forcibly start moving to the return position.

12. The mobile object according to claim 1, wherein when a control command for causing the mobile object to cross the movement range to a side on which the mobile object moves away from the return position is issued, the circuitry is further configured to reject the control command.

13. The mobile object according to claim 1, wherein the circuitry is further configured to determine a route to the return position, when control to move the mobile object to the return position is activated in accordance with a control command from a user or in a forcible manner, and change the route that was determined, wherein when direct return energy to be consumed for movement to the return position becomes larger than the amount of energy remaining in the mobile object during the movement to the return position along the route that was determined, the circuitry is further configured to specify a plurality of candidate arrival points, and specify a route to the candidate arrival point closest to the return position among the plurality of candidate arrival points.

14. The mobile object according to claim 13, wherein the circuitry is further configured to specify the plurality of candidate arrival points, based on attribute information about a region on a map and observation information about surroundings of the mobile object.

15. An information processing method comprising:

acquiring an amount of energy remaining in a mobile object;

specifying a movement range in which the mobile object is able to return from a position of the mobile object to a return position, based on the amount of energy remaining in the mobile object; and controlling the mobile object to forcibly start moving to the return position when the mobile object crosses the movement range to a side on which the mobile object moves away from the return position.

16. An information processing system comprising:

a mobile object that includes an imager configured to capture an image of surroundings of the mobile object; and an information processing device that includes circuitry including a processor that is configured to acquire an amount of energy remaining in the mobile object, specify a movement range in which the mobile object is able to return from a position of the mobile object to a return position, based on the amount of energy remaining in the mobile object, and control a display to display the movement range superimposed on a map image, wherein the circuitry is further configured to specify a region adjacent to a boundary of the movement range on a side of the return position based on the image captured by the imager, and when attribute information about the region that was specified and/or an object included in the region is classified as an unrecommended type in terms of entry, change the movement range in accordance with the region corresponding to the attribute information classified as the unrecommended type and/or the region including the object.

17. A non-transitory computer-readable storage device having a computer program product for causing a computer to carry out:

acquiring an amount of energy remaining in a mobile object;

specifying a movement range in which the mobile object is able to return from a position of the mobile object to a return position, based on the amount of energy remaining in the mobile object;

determining a route to the return position, when control to move the mobile object to the return position is activated in accordance with a control command from a user or in a forcible manner;

changing the route that was determined; and when direct return energy to be consumed for movement to the return position becomes larger than the amount of energy remaining in the mobile object during the movement to the return position along the route that was determined, specifying a plurality of candidate arrival points and further specifying a route to the candidate arrival point closest to the return position among the plurality of candidate arrival points.

\* \* \* \* \*